US012565031B2

(12) United States Patent
Fuhr

(10) Patent No.: US 12,565,031 B2
(45) Date of Patent: Mar. 3, 2026

(54) STAINABLE MELAMINE LAMINATE PRODUCTS, COMPOSITIONS, AND METHODS OF MANUFACTURE

(71) Applicant: PRESSING DEVELOPMENTS, L.L.C., Georgetown, TX (US)

(72) Inventor: Adam Curtis Fuhr, Georgetown, TX (US)

(73) Assignee: PRESSING DEVELOPMENTS, L.L.C., Georgetown, TX (US)

( * ) Notice: Subject to any disclaimer, the term of this patent is extended or adjusted under 35 U.S.C. 154(b) by 1091 days.

(21) Appl. No.: 17/100,282

(22) Filed: Nov. 20, 2020

(65) Prior Publication Data

US 2021/0070027 A1 Mar. 11, 2021

Related U.S. Application Data

(63) Continuation-in-part of application No. 16/967,727, filed as application No. PCT/US2019/017554 on Feb.
(Continued)

(51) Int. Cl.
*B32B 27/42* (2006.01)
*B32B 27/08* (2006.01)
(Continued)

(52) U.S. Cl.
CPC .............. *B32B 27/42* (2013.01); *B32B 27/08* (2013.01); *B32B 27/10* (2013.01); *B32B 27/16* (2013.01);
(Continued)

(58) Field of Classification Search
CPC ........ B32B 2260/028; B32B 2260/046; B32B 2307/75; B32B 27/42; B32B 2317/125;
(Continued)

(56) References Cited

U.S. PATENT DOCUMENTS 2,537,520 A 1/1951 Eger
3,135,643 A 6/1964 Michl
(Continued)

FOREIGN PATENT DOCUMENTS

EP 0054405 A1 6/1982
EP 0993944 A2 * 4/2000
(Continued)

OTHER PUBLICATIONS

Partial machine translation of JP-2012158693-A (generated Jan. 24, 2024).*
(Continued)

*Primary Examiner* — Kregg T Brooks
(74) *Attorney, Agent, or Firm* — FULLER IP LAW LLC; Scott H. Blackman

(57) ABSTRACT

The present disclosure describes laminate products capable of retaining a wood stain or colorant. The unique resin binder formulations, preferably a melamine formulation, and products include porosity-promoting agents that result in the resin binder layer having a porous surface capable of being stained with a wood stain or other colorant, while still having the favorable properties of traditional laminate products. The methods of the invention produce a laminate product that can be stained with a variety of stains and colorants after manufacturing to suit the individual builder's or homeowner's preference. The stainable laminate products may include a decorative paper layer sandwiched between a backing layer and a resin binder layer embedded with a porosity agent, such as, silica, wax, mica, calcium carbonate, silane, kaolin clay, crystalline silica, corn starch, feldspar, talc, or combinations thereof. The stainable resin binder layer optionally has a textured top surface.

18 Claims, 7 Drawing Sheets

Related U.S. Application Data 11, 2019, now Pat. No. 12,415,292, and a continuation-in-part of application No. 15/674,510, filed on Aug. 10, 2017, now Pat. No. 12,109,794.

(60) Provisional application No. 62/628,618, filed on Feb. 9, 2018, provisional application No. 62/412,256, filed on Oct. 24, 2016, provisional application No. 62/373,287, filed on Aug. 10, 2016.

(51) Int. Cl.

| | |
|---|---|
| *B32B 27/10* | (2006.01) |
| *B32B 27/16* | (2006.01) |
| *B32B 27/20* | (2006.01) |
| *C09D 161/28* | (2006.01) |

(52) U.S. Cl.

CPC .......... *B32B 27/205* (2013.01); *C09D 161/28* (2013.01); *B32B 2260/028* (2013.01); *B32B 2260/046* (2013.01); *B32B 2305/026* (2013.01); *B32B 2305/72* (2013.01); *B32B 2307/412* (2013.01); *B32B 2317/125* (2013.01)

(58) Field of Classification Search

CPC ......... B32B 21/06; B32B 21/08; C08L 61/28; C08L 61/02; C09D 161/02; C09D 161/28; C09J 161/02; C09J 161/28; C08J 2361/02; C08J 2361/28

See application file for complete search history.

(56) References Cited

U.S. PATENT DOCUMENTS

| | | | | |
|---|---|---|---|---|
| 3,434,919 A | | 3/1969 | Whitman | |
| 3,525,664 A | | 8/1970 | Hale et al. | |
| 3,623,990 A | * | 11/1971 | Cambre | D06B 23/042 |
| | | | | 510/397 |
| 3,684,649 A | | 8/1972 | Shelton et al. | |
| 3,850,589 A | * | 11/1974 | Charvat | B24D 18/00 |
| | | | | 51/296 |
| 3,928,706 A | * | 12/1975 | Gibbons | B44C 5/0476 |
| | | | | 428/323 |
| 4,140,837 A | * | 2/1979 | Drees | D21H 27/26 |
| | | | | 428/409 |
| 4,214,026 A | * | 7/1980 | Ibata | H05K 1/036 |
| | | | | 156/244.17 |
| 4,258,103 A | | 3/1981 | Hosner et al. | |
| 4,322,468 A | * | 3/1982 | Raghava | B32B 38/08 |
| | | | | 427/372.2 |
| 4,713,138 A | * | 12/1987 | Ungar | B32B 29/00 |
| | | | | 428/326 |
| 5,229,217 A | | 7/1993 | Holzer | |
| 5,552,353 A | | 9/1996 | Kwong | |
| 5,702,806 A | | 12/1997 | O'Dell et al. | |
| 5,736,228 A | | 4/1998 | Morris et al. | |
| 6,001,925 A | | 12/1999 | Gapud et al. | |
| 6,077,614 A | | 6/2000 | Conti et al. | |
| 2002/0160680 A1 | | 10/2002 | Laurence et al. | |
| 2003/0055145 A1 | | 3/2003 | Safta et al. | |
| 2003/0071884 A1 | | 4/2003 | Iwasa et al. | |
| 2004/0249045 A1 | | 12/2004 | Goodman et al. | |
| 2008/0268273 A1 | | 10/2008 | O'Brien et al. | |
| 2009/0239175 A1 | | 9/2009 | Steinmann | |
| 2010/0307675 A1 | | 12/2010 | Buhlmann | |
| 2010/0310893 A1 | | 12/2010 | Derbyshire et al. | |
| 2012/0107625 A1 | | 5/2012 | Smith et al. | |
| 2012/0128946 A1 | | 5/2012 | Kwon et al. | |
| 2013/0331494 A1 | | 12/2013 | Lu et al. | |
| 2015/0132510 A1 | | 5/2015 | Fukunaga et al. | |
| 2017/0328063 A1 | * | 11/2017 | André | B32B 5/22 |

FOREIGN PATENT DOCUMENTS

| | | | | |
|---|---|---|---|---|
| EP | 1710214 A1 | * | 10/2006 | B05D 5/06 |
| EP | 1941322 A1 | | 7/2008 | |
| JP | 2003225985 A | | 8/2003 | |
| JP | 3998531 B2 | | 10/2007 | |
| JP | 2012158693 A | * | 8/2012 | |
| JP | 2012206473 A | * | 10/2012 | |
| KR | 100579841 B1 | | 5/2006 | |
| KR | 10-2006-0078965 A | | 7/2006 | |
| KR | 101753523 B1 | | 7/2017 | |
| WO | 2004076177 A1 | | 9/2004 | |
| WO | 2009/141743 A1 | | 11/2009 | |
| WO | WO-2016079245 A1 | * | 5/2016 | B32B 17/02 |

OTHER PUBLICATIONS

Partial machine translation of JP-2012206473-A (generated Jan. 25, 2024).*

Cova Scientific "Heat Activated Adhesive Systems", https://www.covascientific.com/blog/heat-activated-adhesivesystems-an-overview, 2 pages (Sep. 29, 2015).

DSM Composite Resins, Atlac High Performance Resins of Outstanding Quality.

International Search Report for PCT/US2017/046386 dated Oct. 27, 2017.

Partial Machine Translation of KR-101753523-B1 (generated Oct. 2, 2023).

R..E. Carrol Inc. "L-207A Microcrystalline Silica", https://www.recarroll.com/product-details.cfm/ProdID/612/category/346, 9 pages (Jun. 1, 2015).

SoftSchools "Calcium carbonate Formula", http://www.softschools.com/formulas/chemistry/calcium_carbonate_uses properties_structure_ uses _properties_ structure formula/297 /, 1 page (2015).

Written Opinion of the International Searching Authority for PCT/US2017/046386 dated Oct. 27, 2017.

* cited by examiner

STAINABLE MELAMINE LAMINATE PRODUCTS, COMPOSITIONS, AND METHODS OF MANUFACTURE

RELATED APPLICATIONS

This application is a Continuation-in-Part of U.S. patent application Ser. No. 15/674,510, filed on Aug. 10, 2017 (published as US20180043655), which claims the benefit of U.S. Provisional Application No. 62/373,287, filed on Aug. 10, 2016 and the benefit of U.S. Provisional Application No. 62/412,256, filed on Oct. 24, 2016, the contents of each of which are incorporated herein by reference thereto in their entireties.

This application is also a Continuation-in-Part of U.S. patent application Ser. No. 16/967,727, filed on Aug. 5, 2020, which is the National Stage filing of PCT/US2019/017554, filed on Feb. 11, 2019, which claims the benefit of U.S. Provisional Application No. 62/628,618, filed on Feb. 9, 2018, the contents of each of which are incorporated herein by reference thereto in their entireties.

TECHNICAL FIELD

This disclosure relates to stainable laminate wood or wood products, resin binder formulations, and methods of manufacturing stainable laminate products. The methods disclosed herein provide a laminate product capable of being stained, including with typical wood stains, other stains or colorants.

BACKGROUND

Laminated engineered wood products are in high demand in the market and used in applications including furniture, cabinetry, flooring, walls, paneling, doors, and shelving. Many engineered wood products are laminated with a thermoset polymer adhered to a composite wood substrate. These laminated engineered wood products can be more economical and long-lasting than traditional wood products, but laminated engineered wood products are not reliably stainable. Consumer demand for high quality products that look like wood has led to laminated porous panel products and other engineered wood products that mimic wood grains and colors, but it is typically evident even without close inspection that the product is not real wood.

Laminated engineered wood products that appear "wood-like" also suffer from an additional drawback—they rely on processes that fix the color of the laminate at the factory. Thus, a consumer or decorator is limited in color choice and forced to buy laminated engineered wood products from a single manufacturer if the products are to match each other in color. Further, a manufacturer must determine how many shades and patterns of different wood-like products to carry and manufacture. This inflexibility at the manufacturer leads to both unsold stock and unmet consumer demand when the colors produced do not accurately predict demand. Even still, the consumer often makes compromises by limiting color choices or unknowingly installing poor color matches.

In contrast, hardwood veneers are able to readily take a wood stain that can be applied on-site. Hardwood veneers, however, are costly and many desirable and exotic hardwood veneers use hardwood materials that may not be sustainable wood products. The cost of engineered wood products is drastically lower than hardwood veneers. These engineered wood products are also much more sustainable as they are byproducts of the woodworking industry globally.

Accordingly, there is a need for Laminate engineered wood products and methods of manufacturing engineered wood products that are capable of being stained with a wood stain, other stain or colorant. There is also a need to provide compositions and methods of providing a professional high quality look similar to hardwood veneer panels or better. The products and methods disclosed herein would reduce manufacturing and consumer costs and provide far greater flexibility for the consumer to use a number of various wood stains and staining methods currently available for wood and hardwood veneers only.

SUMMARY

Aspects of this document relate to stainable melamine laminate products, melamine formulation compositions, and methods of manufacturing stainable melamine laminate products. These aspects may comprise, and implementations may include, one or more or all of the components and steps set forth in the appended claims, which are hereby incorporated by reference. In one aspect, a stainable melamine laminate product comprises: a substrate; and a melamine layer affixed to the substrate, wherein the melamine layer comprises a melamine formulation and a sheet, the melamine formulation having a porosity agent to allow staining of the melamine.

Particular embodiments and implementations may comprise one or more of the following features. The porosity agent or a combination of porosity agents is in an amount of between 25 to 175 grams per square meter. The first side of the sheet is saturated with the melamine formulation comprising the porosity agent and the sheet is a decorative paper. The porosity agent or a combination of porosity agents comprise between 10% and 70%, more preferably between 25% and 65% of the weight of the melamine formulation before curing, or between 30% and 80% of the weight of the melamine formulation after curing. The porosity agent or a combination of porosity agents comprise between 35% and 75% of the weight of the melamine formulation before curing, or between 40% and 85% of the weight of the melamine formulation after curing. The porosity agent or a combination of porosity agents comprise between 40% and 70% of the weight of the melamine formulation before curing, or between 45% and 75% of the weight of the melamine formulation after curing. The porosity agent or a combination of porosity agents comprise between 35% and 75% (e.g., 40-75%, 45-70%, 50-65%, 45-65%, 45-55%, 50-60%, 50-55%, 55-65%, 50-70%, 55-75%, or 60-75%) of the weight of the melamine formulation before curing, or between 40% and 85% (e.g., 45-85%, 45-80%, 45-80%, 45-75%, 50-75%, 55-75%, 50-70%, 60-70%, 60-80%, 55-80%, 55-70%, or 55-65%) of the weight of the melamine formulation after curing. The porosity agent or a combination of porosity agents comprise at least 35% (e.g., at least 35%, at least 40%, at least 45%, at least 50%, at least 55%, at least 60%, or at least 65%) of the weight of the melamine formulation before curing, or at least 40% (e.g., at least 40%, at least 45%, at least 50%, at least 55%, at least 60%, at least 65%, or at least 70%) of the weight of the melamine formulation after curing.

Particular embodiments and implementations may comprise one or more of the following features. The stainable melamine laminate product further comprises: a phenolic backing layer having a first side and a second side opposite the first side, the first side being affixed to the melamine laminate product; and a decorative design on the phenolic backing layer; wherein the sheet is non-opaque and affixed to the second side of the backing layer. The stainable melamine laminate product further comprises a second melamine layer, the second melamine layer comprising a second sheet and a melamine formulation having a porosity agent, wherein the second melamine layer is affixed to the first melamine layer.

In one aspect, a stainable melamine laminate product comprises: a phenolic backing layer having a first side and a second side opposite the first side, the first side being affixed to the melamine laminate product; and a melamine layer affixed to the second side of the backing layer, wherein the melamine layer comprises a melamine formulation and a non-opaque melamine saturated sheet, the melamine formulation having a porosity agent.

Particular embodiments and implementations may comprise one or more of the following features. The porosity agent is selected from the group consisting of: kaolin clay; crystalline silica; corn starch; talc; feldspar; titanium dioxide; mica; calcium carbonate; untreated silica particles; cellulosic particles; wax particles; Minex®; silicon dioxide; sodium oxide; calcium oxide; iron oxide; potassium oxide; precipitated calcium carbonate; wollastonite; silicate minerals; or combination thereof. The phenolic backing layer comprises paper. The melamine layer further comprises: at least a second porosity agent. The decorative design comprises a design of a wood grain.

In one aspect, a method of manufacturing a stainable melamine laminate product comprises: saturating a sheet with a melamine formulation, the melamine formulation comprising between 35% and 80% by weight of a porosity agent or a combination of porosity agents; partially curing the sheet with heat; and pressing the sheet to a substrate under heat and pressure. In another aspect, a method of manufacturing a stainable melamine laminate product comprises: saturating a sheet with a melamine formulation, the melamine formulation comprising between 35% and 80% by weight of a porosity agent or a combination of porosity agents; partially curing the sheet with heat; and pressing the sheet to a substrate under heat and pressure.

Particular embodiments and implementations may comprise one or more of the following features. The method of manufacturing a stainable melamine laminate product further comprises: applying a stain to the sheet; and applying a finishing coat to the sheet over the stain. The porosity agent or the combination of porosity agents comprises between 35% and 65% of the total formulation weight of the melamine formulation. The porosity agent or the combination of porosity agents comprises between 40% and 65% of the total formulation weight of the melamine formulation. The porosity agent or the combination of porosity agents comprises between 45% and 55% of the total formulation weight of the melamine formulation. The porosity agent or a combination of porosity agents is in an amount of between 40 to 150 grams per square meter. The porosity agent or a combination of porosity agents is in an amount of between 40 to 140 grams per square meter. The porosity agent or a combination of porosity agents is in an amount of between 50 to 130 grams per square meter. The porosity agent or a combination of porosity agents is in an amount of between 60 to 120 grams per square meter. The porosity agent or a combination of porosity agents is in an amount of between 55 to 125 grams per square meter. The porosity agent or a combination of porosity agents is in an amount of between 70 to 140 grams per square meter. The porosity agent or a combination of porosity agents is in an amount of between 40 to 145 grams per square meter (e.g., 45-140, 50-135, 60-135, 60-110, 55-100, 55-145, 55-125, 65-140, 65-125, 65-110, 65-90, 75-145, 75-125, or 80-110 grams per square meter).

Particular embodiments and implementations may comprise one or more of the following features. At least one porosity agent is a mineral ranging in size from 1-75 µm and/or a density from 1.0 to 3.5 g/cm$^3$. The at least one porosity agent is a mineral with a density from 0.9 to 3.8 g/cm$^3$, the mineral ranging in size from 1-85 µm. At least one porosity agent is selected from the group consisting of: kaolin clay; crystalline silica; corn starch; talc; feldspar; titanium dioxide; mica; calcium carbonate; untreated silica particles; cellulosic particles; wax particles; Minex®; silicon dioxide; sodium oxide; calcium oxide; iron oxide; potassium oxide; precipitated calcium carbonate; wollastonite; silicate minerals; or combination thereof. At least one porosity agent is selected from the group consisting of: talc, feldspar, Minex®, calcium carbonate, untreated silica, treated silica, kaolin clay; or combination thereof.

In one aspect, a melamine formulation composition comprises: a melamine formaldehyde resin; and a porosity agent, wherein the porosity agent or combination of porosity agents is from 35% to 80% of total formulation weight.

Particular embodiments and implementations may comprise one or more of the following features. At least one additive, wherein the additive is from 0% to 5% of total formulation weight. At least one additive, wherein the additive is from 0% to 5% (e.g., 0-4%, 0-3%, 0-2%, 0.2-4%, 0.2-2.5%, 0.5-3.5%, 1-4%, 1-2%, 2-5%, 3-4%, or 3-5%) of total formulation weight. At least one additive, wherein the additive is up to 10% (e.g., up to 9%, 7.5%, 6%, 4%, 2%, 8%, or 7%) of total formulation weight. The porosity agent or combination of porosity agents comprises between 35% and 65% of the total formulation weight of the melamine formulation. The porosity agent or combination of porosity agents comprises between 40% and 65% of the total formulation weight of the melamine formulation. The porosity agent or combination of porosity agents comprises between 45% and 55% of the total formulation weight of the melamine formulation.

Particular embodiments and implementations may comprise one or more of the following features. At least one porosity agent is selected from the group consisting of: kaolin clay; crystalline silica; corn starch; talc; feldspar; titanium dioxide; mica; calcium carbonate; untreated silica particles; cellulosic particles; wax particles; Minex®; silicon dioxide; sodium oxide; calcium oxide; iron oxide; potassium oxide; precipitated calcium carbonate; wollastonite; silicate minerals; or combination thereof. At least one porosity agent is selected from the group consisting of: talc, feldspar, Minex®, calcium carbonate, untreated silica, treated silica, kaolin clay, or combination thereof.

BRIEF DESCRIPTION OF THE DRAWINGS

FIGS. 1-13 are not drawn to scale and should not be interpreted as being to scale. For example, the substrate or porous panel product shown may be tens or hundreds of times thicker than the total of all resin binder and backing layers.

DETAILED DESCRIPTION

Figure 1:
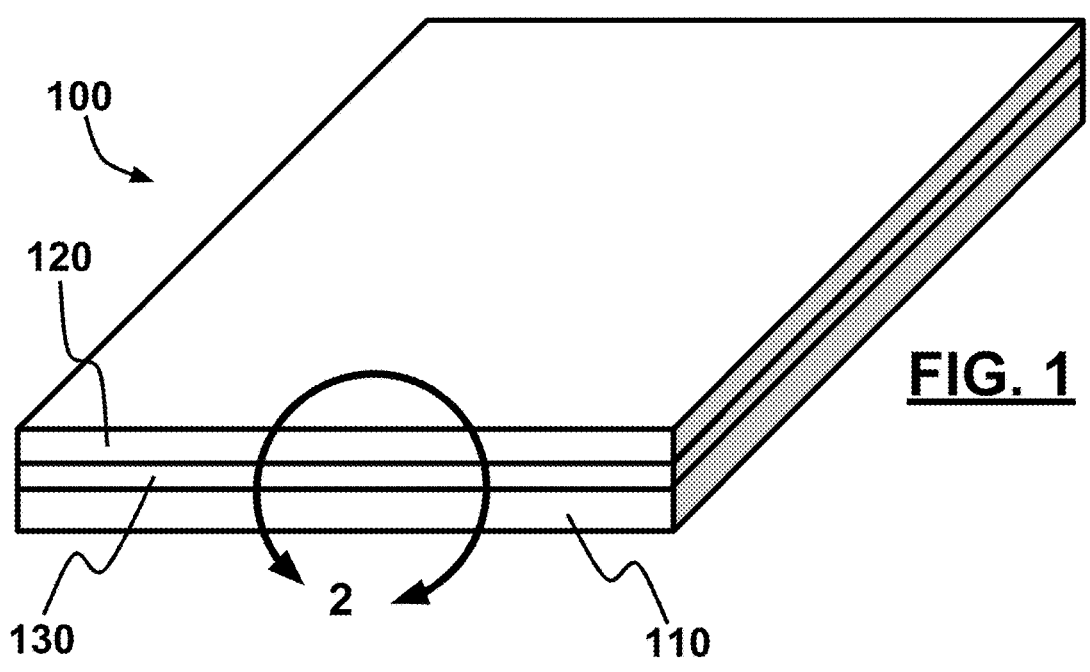
FIGS. 1-2 depict non-limiting examples of a stainable laminate product.

The verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one."

As used herein, the term "porous panel product" refers to engineered wood products that are composite materials manufactured by binding or fixing the strands, particles, fibers, chips, or boards of woods together with some method of fixation. Specific examples of porous panel products include medium density fiberboard (MDF), a high density fiberboard (HDF), a medium density overlay (MDO), or a high density overlay (HDO), oriented strand board (OSB), particle board, chip board, vermiculite, fiber-reinforced plastic (FRP), panel products, and plywood. One of ordinary skill in the art will recognize that the materials used to construct a porous panel product may change over time as availability of resources change, and porous panel products may be constructed at least partially of other plant materials (e.g., palm trees or plants, plant or tree leaves, palm fronds, coconuts, coconut husks, natural rubber, grasses, bamboo, fibrous plant material, etc.) and non-plant materials (e.g., plastics, synthetic rubber, recycled materials, etc.), and the term "porous panel product" may include one or more of these materials or other materials yet to be developed or yet to come into use. In preferred embodiments, a porous panel product refers to a particle board, chip board, oriented strand board (OSB), medium density fiberboard (MDF), a high density fiberboard (HDF), a medium density overlay (MDO), or a high density overlay (HDO).

As used herein, the term "resin" or "resin binder" refers generally to synthetic materials that are viscous liquids capable of hardening permanently. Non-limiting examples of resins include polymers, melamines, thermosetting plastics, phenolics, oligomers, alkyds, acrylics, acrylates, epoxies, urethanes, urea formaldehydes, polyesters, and polycarbonates.

As used herein, the term "thermosetting polymer resin" refers to a polymer that is irreversibly hardened by curing from a soft solid or viscous liquid prepolymer or resin. Non-limiting examples of thermosetting polymer resins include polymers, melamines, thermosetting plastics, phenolics, oligomers, epoxies, urethanes, urea formaldehydes, polyesters, polycarbonates, etc., and combinations thereof.

As used herein, the term "melamine" refers to the organic compound with the formula $C_3H_6N_6$ or $C_3N_3(NH_2)_3$, IPAC Name: 1,3,5-triazine-2,4,6-triamine. The term "melamine resin" or "melamine formaldehyde" refers to a hard, thermosetting plastic material made from melamine and formaldehyde by polymerization.

As used herein, the term "urea" refers to the organic compound with the formula $CO(NH_2)_2$. The term "urea-formaldehyde resin" refers to a non-transparent thermosetting resin or polymer produced from urea and formaldehyde.

As used herein, the term "additive" refers to generally to compounds that make the product flow, level, dilute, reduce, react, and/or defoam, for example a deaerator. Accordingly, additives include surface modifiers, curing agents, and the like.

As used herein, the terms "wood stain" or "stain" refer to a colorant (e.g., one or more dyes and/or pigments) suspended or dissolved in an agent or solvent, including without limitation: oil stains, varnish stains, water-based stains, solvent-based stains, gel stains, lacquer stains, water-soluble dye stain, ultra-violet (UV) light cured colorants (resins, sealants, stains, etc.), metal-complex (metalized) dye stains, or similar stains or colorants now existing or yet to be discovered that may be used to stain wood, porous panel products, or other porous organic and inorganic materials.

As used herein, the term "stainable" refers to an ability of the surface of a material to have absorption characteristics that allow a pigment or dye to penetrate which creates a "stain" effect.

As used herein, the terms "finishing coating" or "finishing coat" refer to coating layer(s) visible upon completion and final assembly of a product made from porous panel product, such as cabinetry, flooring, furniture, millwork, and fixtures. Generally, the finishing coating is applied to the surface of a sealed/primed substrate, and lacquers and varnishes are common examples of finishing coatings.

As used herein, the term "pigment volume concentration" or "PVC" refers to the volume percentage of solid particles in the system after film formation. The calculation is as follows: the volume of the porosity agent divided by the volume of the porosity agent plus the resin volume solids. "Pigment volume concentration" determines if there is enough mineral in the resin system to actually realize the absorbency of the minerals in the final surface.

The present disclosure relates to the discovery that certain porosity-promoting surface agents included in a formulation of a resin binder (e.g., a thermosetting polymer resin such as a melamine resin) impregnated in a paper layer result in the resin binder treated layer having a porous surface that is capable of being stained with a wood stain or other colorant, which allows a laminate product to be stained with a variety of wood stains after being manufactured.

Aspects of this disclosure relates to stainable laminate wood or wood products, resin binder compositions, and methods of manufacturing stainable laminate wood or wood products. These aspects may comprise, and implementations may include, one of more or all of the components and steps set forth in the appended claims, which are hereby incorporated by reference.

In one aspect, a stainable laminate product comprises: a wood or wood product substrate and a sheet of paper or fiber affixed to the substrate, wherein the sheet is treated with a resin binder that comprises an aqueous resin comprising one or more porosity agents to allow staining.

In another aspect, the method of manufacturing a stainable laminate wood or wood product comprises: a) treating a sheet with a resin binder, wherein the resin binder is derived from an aqueous resin comprising one or more porosity agents in an amount between 25 to 175 grams per square meter of the substrate; b) partially curing the sheet with heat; and c) pressing the sheet to the substrate under heat and/or pressure. In a further aspect, the method further comprises: d) applying a stain to the sheet; and e) applying a finishing coat to the sheet over the stain.

Particular embodiments and implementations may comprise one or more of the following features.

The aqueous resin is selected from the group consisting of: polymers, melamines, thermosetting plastics, phenolics, oligomers, alkyds, acrylics, acrylates, epoxies, urethanes, urea formaldehydes, polyesters and polycarbonates. In some embodiments, the aqueous resin is selected from the group consisting of: melamine formaldehyde resins, urea formaldehydes resins, polyurethane resins, polyester resins, acrylic resins, thermosetting acrylic resins, and mixtures thereof. In further embodiments, the aqueous resin is selected from the group consisting of: melamine formaldehyde resins, urea formaldehyde resins, and mixtures thereof.

In some embodiments, the amount of aqueous resin per square meter of substrate is between 100 and 240 grams, for example, 110-230 grams, 120-220 grams, 130-210 grams, 140-200 grams, 140-195 grams, 145-190 grams, 150-190 grams, 150-185 grams, 160-180 grams, 165-180 grams, or 165-175 grams.

In other embodiments, the aqueous resin is melamine formaldehyde resin and the amount per square meter of substrate is between 100 and 240 grams, for example, 110-210 grams, 120-200 grams, 120-190 grams, 130-190 grams, 130-185 grams, 135-180 grams, 140-180 grams, 140-175 grams, 140-160 grams, 150-170 grams, 155-170 grams, or 150-160 grams.

In other embodiments, the aqueous resin is urea formaldehyde resin and the amount per square meter of substrate is between 100 and 240 grams, for example, 120-240 grams, 130-230 grams, 140-220 grams, 150-210 grams, 150-205 grams, 155-200 grams, 160-200 grams, 160-195 grams, 170-190 grams, 175-190 grams, or 175-185 grams.

In some embodiments, the aqueous resin consists of a combination of melamine formaldehyde resin and urea formaldehyde resin, and the amount of aqueous resin per square meter of substrate is between 100 and 240 grams, for example, 100-220 grams, 110-210 grams, 120-200 grams, 130-190 grams, 130-185 grams, 135-180 grams, 140-180 grams, 140-175 grams, 150-170 grams, 155-170 grams, or 150-160 grams. In non-limiting embodiments, a typical ratio between melamine formaldehyde resin and urea formaldehyde resin can be between 90% to 10%, for example, 80%, 70%, 65%, 60%, 55%, 50%, 45%, 30%, 20%, or 10%.

In some embodiments, the one or more porosity agents are selected from the group consisting of: kaolin clay; crystalline silica (e.g., microcrystalline silica, untreated silica, treated silica, and silicate minerals); corn starch; talc; feldspar; titanium dioxide; mica; calcium carbonate; cellulosic particles; wax particles; Minex®; silicon dioxide; sodium oxide; calcium oxide; iron oxide; potassium oxide; calcium carbonate (e.g., precipitated calcium carbonate(; wollastonite;

and combinations thereof. In other embodiments, the one ore more porosity agents are selected from the group consisting of: talc, feldspar, Minex®, calcium carbonate, crystalline silica, kaolin clay, and combinations thereof. In further embodiments, the one or more porosity agents are selected from the group consisting of: talc, feldspar, and combinations thereof. In even further embodiments, the one or more porosity agents are selected from the group consisting of: calcium carbonate, crystalline silica, and combinations thereof.

In some embodiments, the porosity agent is one or more minerals, ranging in size from 0.01-85 µm, for example, 0.01-80 µm, 0.1-80 µm, 0.5-75 µm, 1-85 µm, 1-45 µm, 10-70 µm, 20-60 µm, 20-65 µm, 25-65 µm, 25-60 µm, 30-60 µm, 30-55 µm, 35-55 µm, 35-50 µm, 40-50 µm, or 40-45 µm.

In some embodiments, the porosity agent comprises calcium carbonate, typically ranging in size from 10-15 µm, for example, 10-14 µm, 10.1-13.5 µm, 10.2-13 µm, 10.3-13 µm, 10.3-12.5 µm, 10.4-12.5 µm, 10.4-12 µm, 10.5-12 µm, or 10.5-11.5 µm.

In some embodiments, the porosity agent comprises microcrystalline silica, typically ranging in size from 1.5-5 µm, for example, 1.5-4.6 µm, 1.5-4.2 µm, 1.6-4.2 µm, 1.6-3.8 µm, 1.7-3.8 µm, 1.7-3.4 µm, 1.8-3.4 µm, 1.8-3 µm, 1.9-3 µm, 1.9-2.6 µm, 2-2.6 µm, or 2-2.2 µm.

In certain embodiments, the porosity agent comprises calcium carbonate and microcrystalline silica. In non-limiting embodiments, weight ratio between calcium carbonate and microcrystalline silica may be 4:1, 3:1, 2:1, 1.5:1, 1:1, 1:1.5, or 1:2.

In some embodiments, the at least one porosity agent is a mineral, typically having a density from 0.9 to 3.8 g/cm$^3$, for example, 0.9 to 3.7 g/cm$^3$, 1 to 3.7 g/cm$^3$, 1.1 to 3.4 g/cm$^3$, 1.4 to 3.4 g/cm$^3$, 1.4 to 3.1 g/cm$^3$, 1.7 to 3.1 g/cm$^3$, 1.7 to 2.8 g/cm$^3$, 2 to 2.8 g/cm$^3$, or 2 to 2.5 g/cm$^3$.

In certain embodiments, the typical amount of the one or more porosity agent is between 25-175 grams per square meter (gsm) of the substrate, for example, 35-160 gsm, 45-155 gsm, 55-145 gsm, 60-145 gsm, 25-105 gsm, 70-130 gsm, 80-125 gsm, 80-115 gsm, 85-115 gsm, 85-110 gsm, 90-110 gsm, 90-105 gsm, or 95-105 gsm.

In some embodiments, before curing, the typical formula weight percentage of the one or more porosity agents of the aqueous resin is between 30-75%, for example, 30-70%, 35-75%, 35-70%, 35-65%, 35-60%, 35-55%, 35-50%, 40-70%, 40-65%, 40-50%, 45-65%, 45-60%, 50-60%, or 40-46%.

In some embodiments, before curing, the typical formula weight percentage of the one or more porosity agents is at least 30%, for example, at least 35%, at least 40%, at least 45%, at least 50%, at least 55%, at least 60%, at least 65%, or at least 70%.

In some embodiments, after curing, the typical total solid weight percentage of the one or more porosity agents of the aqueous resin is between 40-85%, for example, 40-80%, 45-80%, 45-75%, 50-75%, 50-70%, 55-70%, 55-65%, or 58-62%.

In some embodiments, after curing, the typical total solid weight percentage of the one more porosity agents of the aqueous resin is at least 40%, for example, at least 45%, at least 50%, at least 55%, at least 60%, at least 65%, at least 70%, at least 75%, or at least 80%.

In some embodiments, the aqueous resin comprises one or more additives, wherein the additive is selected from the group consisting of: one or more wetting agents, release agents, and catalysts.

In some embodiments, before curing, the volume percentage of the one or more additives of the aqueous resin is between 0-5%, for example, 0.1-4.5%, 0.2-4%, 0.3-3.5%, 0.5-3%, 0.6-3%, 0.6-2.5%, 0.7-2.5%, 0.7-2%, 0.8-2%, 0.8-1.5%, 0.9-1.5%, or 0.9-1.1%.

In some embodiments, before curing, the volume percentage of the one or more additives of the aqueous resin is up to 10%, for example, up to 9%, up to 8%, up to 7%, up to 6%, up to 5%, up to 4%, up to 3%, up to 2.5%, up to 2%, up to 1.5%, up to 1%, or up to 0.5%.

In certain embodiments, there is only one sheet. The sheet is paper or fiber selected from the group consisting of: translucent paper, decorative paper, Kraft paper, overlay paper, fabric, linen, and fibrous material. In other embodiments, there is more than one sheet. Each sheet is independently selected from the group consisting of: translucent paper, decorative paper, Kraft paper, overlay paper, fabric, linen, and fibrous material. In certain embodiments, the decorative sheet comprises a design of a wood grain.

In some embodiments, the sheet is saturated with the resin binder. In embodiments where there are two or more sheets, each sheet may be treated with the same resin binder or different resin binders.

Particular embodiments and implementations may further comprise a phenolic backing layer having a first side and a second side opposite the first side. The first side is affixed to the substrate, and the second side is affixed to a sheet, wherein the sheet is non-opaque and/or has a decorative design. In further embodiments, the phenolic backing layer comprises paper. In further embodiments, the decorative design comprises a design of a wood grain.

In some embodiments, the stainable laminate wood or wood product further comprises a second resin binder layer, the second resin binder layer comprising a second sheet and an aqueous resin having one or more porosity agents, wherein the second resin binder layer contacts the first resin binder layer.

EXAMPLES

Example 1

Stainable Laminate Wood or Wood Products

Figure 2:
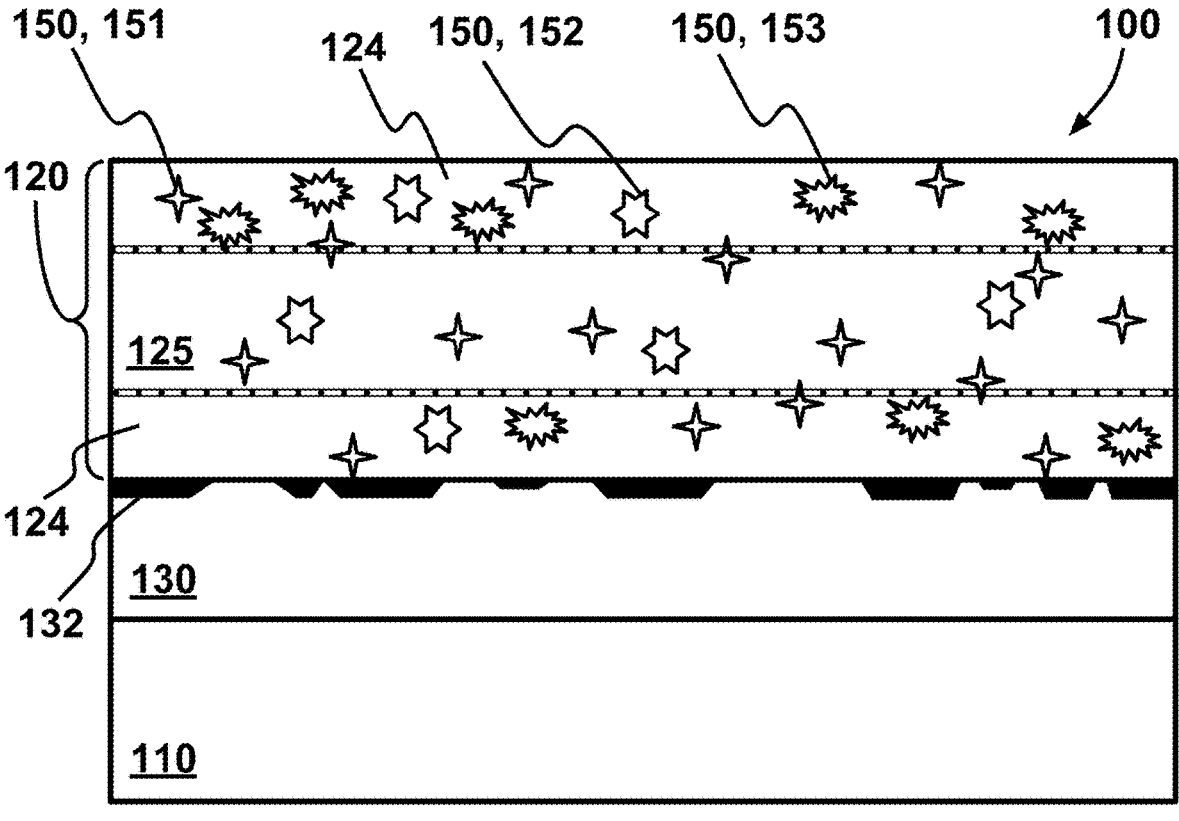

FIGS. 1-2 depict various implementations of a stainable laminate product 100 formed by adding at least one porosity agent 150 before pressing and curing the resin 124. A stainable laminate product 100 is formed by adding at least one porosity agent 150 to a resin binder layer 120 before pressing and curing the resin binder layer 120.

One or more thermosetting resins may be used for the resin binder layer 120, including melamine formaldehyde resins, urea formaldehyde resins, a combination of melamine formaldehyde and urea formaldehyde resins, polyurethane resins, polyester resins, or acrylic resins. The resin binders may be commercially available.

While polyester resins work well in TFL processes, melamine (molecular formula $C_3H_6N_6$ or $C_3N_3(NH_2)_3$; IUPAC Name: 1,3,5-triazine-2,4,6-triamine) resins are more common in TFL processes because polyester resins are more costly. The resin 124 comprising porosity agents 150 to make the stainable resin binder layer 120 may be any one of various different commercially available resins. One example of a formulation for a resin 124 includes: 89% by weight of melamine formaldehyde resin; 7.62% by weight of water; 1.6% by weight of additives (not the porosity agents 150); 0.53% by weight of wetting agents; 0.5% by weight of a catalyst; and 0.75% by weight of a plasticizer. Another example of a formulation for a resin 124 includes (by weight): 33.25% melamine formaldehyde resin, 0.11% wetting agent, 0.11% release agent, 17.3% water, 0.13% catalyst, 29.5% calcium carbonate, and 19.6% silica. Another example of a formulation for a melamine resin 124 includes: 60% solids aqueous solution of melamine formaldehyde resin; adding water to dilute the melamine formaldehyde resin down to 52% solids aqueous solution; and then adding a small amount of release agent and a catalyst (e.g., 0.4% by total weight of a release agent and 0.3% by total weight of a catalyst).

Existing formulations of thermosetting polymer resins or thermosetting acrylic resins may be used in the present disclosure as the resin 124 to create stainable resin binder layers 120 by adding porosity agents 150 as disclosed herein. For example, melamine-formaldehyde resin may be commercially available from manufacturers, such as: Dynea International Oy; Georgia-Pacific Chemicals, LLC; or Hexion Specialty Chemicals, Inc. Additionally, the resin binder 124 may also contain one or more plasticizers, surfactants, defoaming agents, thickening agents, leveling agents, latent catalysts, or wetting agents. In processing, the resin binder may be diluted (e.g., with a solvent or water) in a bath for saturating the paper or other layer (e.g., sheet 125) being processed in the resin binder bath.

The resin 124 to which the porosity agents 150 are incorporated or added can be any commercially viable resins (thermosetting acrylic resin, thermosetting polymer resin, or a combination of thermosetting acrylic resin and thermosetting polymer resin), including, for example, any of a variety of known melamine formaldehyde resins, urea formaldehyde resins, or melamine rea formaldehyde resins that are presently commercially available or in use. Non-limiting examples of melamine formulations are described in greater detail, and hereby incorporated by reference in their entirety, in the following patents and references: U.S. Pat. Nos. 5,702,806; 4,250,282; 4,109,043; 4,044,185; 4,713,299; 2,260,239, 3,496,131; EP Patent No. 0711792; H. Deim, et al. "*Amino Resins*" in Ullmann's Encyclopedia of Industrial Chemistry, 2012, Wiley-VCH, Weinheim. Urea formaldehyde resins (e.g., used to pre-wet a sheet 125) and other supplementary or alternative thermosetting resins include commercially available resins and are also described in several of these patent references. Non-limiting examples of urea formulations are described in greater detail, and hereby incorporated by reference in their entirety, in the following patents and references: U.S. Pat. Nos. 3,769,143 and 2,187, 383.

TABLE 1

| | | | Formula | | Total Solids | |
|---|---|---|---|---|---|---|
| | | A Non-Limiting Melamine Formulation | | | | |
| % NV | Kilograms Per Gallon | Material Name | Weight (kg) | Volume (Gallons) | Weight (kg) | Volume (Gallons) |
| 55.00% | 4.72 | Melamine Resin | 377.84 | 80 | 207.81 | 44 |
| 75.00% | 4.16 | Wetting Agent | 2.27 | 0.55 | 1.7 | 0.41 |
| 50.00% | 4.16 | Release Agent | 1.36 | 0.33 | 0.68 | 0.16 |
| 0.00% | 3.78 | Water | 30.39 | 8.04 | 0 | 0 |
| 75.00% | 4.16 | Catalyst | 2.27 | 0.55 | 1.7 | 0.41 |
| 70.00% | 3.97 | Plasticizer | 3.18 | 0.8 | 2.22 | 0.56 |
| 100.00% | 10.2 | Calcium Carbonate | 250.38 | 24.54 | 250.38 | 24.54 |
| 100.00% | 10.01 | Microcrystalline Silica | 166.92 | 16.67 | 166.92 | 16.67 |

Urea formaldehyde, also known as urea methanal, so named for its common synthesis pathway and overall structure, is a non-transparent thermosetting resin or polymer. It is produced from urea and formaldehyde. These resins are used in adhesives, finishes, particleboard, MDF, and molded objects. The chemical structure of UF polymer consists of $[(O)CNCH_2]_n$ repeat units. Depending on the polymerization conditions, some branching can occur. Early stages in the reaction of formaldehyde and urea produce bis(hydroxymethyl)urea.

some implementations, before curing, the amount of urea formaldehyde resin added to the resin binder formulation is between 2% and 20% of the total formulation weight of the saturation resin 124, or any percent range in between, e.g., 2-18%, 2.5-20%, 2.5-18%, 2.5-16%, 5-18%, 5-16%, 5-15%, 5-14%, 6-14%, 7-13%, 7.5-16%, 7.5-14%, 7.5-12%, 8-12%, 9-11%, or 10-14%, etc.

TABLE 2

A Non-Limiting Urea Formulation

| | | | Formula | | Total Solids | |
|---|---|---|---|---|---|---|
| % NV | Kilograms Per Gallon | Material Name | Weight (kg) | Volume (Gallons) | Weight (kg) | Volume (Gallons) |
| 0.55 | 4.99 | Urea Formaldehyde Resin | 377.84 | 75.73 | 226.71 | 44.00 |
| 0.75 | 3.78 | Water | 37.65 | 9.96 | 0.00 | 0.41 |
| 0.50 | 4.16 | Surfactant | 0.41 | 0.10 | 0.31 | 0.16 |
| 0.75 | 4.16 | Catalyst | 2.27 | 0.55 | 1.70 | 0.41 |
| 0.70 | 3.97 | Plasticizer | 4.54 | 1.14 | 3.18 | 0.56 |
| 1.00 | 10.20 | Calcium Carbonate | 253.56 | 24.86 | 253.56 | 24.86 |
| 1.00 | 10.01 | Microcrystalline Silica | 168.74 | 16.86 | 168.74 | 16.86 |

TABLE 3

A Non-Limiting Melamine (20%)/Urea (80%) Formulation

| | | | Formula | | Total Solids | |
|---|---|---|---|---|---|---|
| % NV | Kilograms Per Gallon | Material Name | Weight (kg) | Volume (Gallons) | Weight (kg) | Volume (Gallons) |
| 0.55 | 4.99 | Urea Formaldehyde Resin | 605.09 | 121.27 | 363.06 | 72.76 |
| 0.75 | 4.72 | Melamine Resin | 164.65 | 34.86 | 90.56 | 19.17 |
| 0.50 | 3.78 | Water | 75.30 | 19.93 | 0.00 | 0.00 |
| 0.00 | 4.16 | Surfactant | 0.82 | 0.20 | 0.61 | 0.15 |
| 0.75 | 4.16 | Catalyst | 4.54 | 1.09 | 3.40 | 0.82 |
| 0.70 | 3.97 | Plasticizer | 9.07 | 2.29 | 6.35 | 1.60 |
| 1.00 | 10.20 | Calcium Carbonate | 522.49 | 51.22 | 522.49 | 51.22 |
| 1.00 | 10.01 | Microcrystalline Silica | 348.31 | 34.79 | 348.31 | 34.79 |

TABLE 4

A Non-Limiting Melamine (80%)/Urea (20%) Formulation

| | | | Formula | | Total Solids | |
|---|---|---|---|---|---|---|
| % NV | Kilograms Per Gallon | Material Name | Weight (kg) | Volume (Gallons) | Weight (kg) | Volume (Gallons) |
| 0.55 | 4.99 | Urea Formaldehyde Resin | 151.10 | 30.36 | 90.90 | 18.22 |
| 0.75 | 4.72 | Melamine Resin | 659.98 | 139.74 | 362.99 | 76.85 |
| 0.50 | 3.78 | Water | 75.30 | 19.93 | 0.00 | 0.00 |
| 0.00 | 4.16 | Surfactant | 0.82 | 0.20 | 0.61 | 0.15 |
| 0.75 | 4.16 | Catalyst | 4.54 | 1.09 | 3.40 | 0.82 |
| 0.70 | 3.97 | Plasticizer | 9.07 | 2.29 | 6.35 | 1.60 |
| 1.00 | 10.20 | Calcium Carbonate | 522.49 | 51.22 | 522.49 | 51.22 |
| 1.00 | 10.01 | Microcrystalline Silica | 348.31 | 34.79 | 348.31 | 34.79 |

In other embodiments, before curing, the amount of melamine formaldehyde resin added to the resin binder formulation is between 15% and 50% of the total formulation weight of the saturation resin 124, or any percent range in between, e.g., 15-45%, 20-50%, 20-45%, 20-40%, 25-50%, 25-45%, 25-40%, 25-35%, 30-50%, 30-45%, 30-40%, or 20-30%, etc.

In other embodiments, the resin binder comprises melamine formaldehyde resin and urea formaldehyde resin. In In some implementations, the resin binder formulation comprises both melamine formaldehyde resin and urea formaldehyde resin. In non-limiting implementations, before curing, a typical ratio (by weight) between melamine formaldehyde resin (e.g., 55%) and urea formaldehyde resin (e.g., 60%) is between 90% (i.e., about 9 melamine formaldehyde resin: 1 urea formaldehyde resin) to 10% (i.e., about 1 melamine formaldehyde resin: 9 urea formaldehyde resin), or any percent range in between, for example, 80%, 70%, 65%, 60%, 55%, 50%, 45%, 30%, or 20%. In some implementations, before curing, the weight ratio between melamine formaldehyde resin (e.g., 55%) and urea formaldehyde resin (e.g., 60%) is between 4:1 and 1:1, for example, between 4:1 and 1.5:1, between 4:1 and 2:1, between 4:1 and 3:1, between 3.5:1 and 1:1, between 3.5:1 and 1.5:1, between 3.5:1 and 2:1, between 3:1 and 1:1, between 3:1 and 1.5:1, between 3:1 and 2:1, between 2.5:1 and 1:1, between 2.5:1 and 1.5:1, between 2.5:1 and 2:1, or between 2:1 and 1.5:1, or between 2:1 and 1:1.

Although many laminate products currently use a melamine-impregnated top-most layer (e.g., overlay paper(s) or decorative paper(s)), the ability to make the top-most layer of a laminate product stainable by adding porosity agents 150 as disclosed is not limited to only layers impregnated with resin 124 (a thermosetting polymer resin, a thermosetting acrylic resin, or a combination of a thermosetting polymer resin and a thermosetting acrylic resin). For example, a urea-impregnated top-most layer or a melamine/urea-impregnated top-most layer. In certain embodiments having only one layer of a resin binder, melamine formaldehyde resin or a combination of urea formaldehyde and melamine formaldehyde resin, for example, will typically be used.

The stainable resin binder layer 120 includes porosity agents 150 and resin 124 impregnated in any one of a variety of different sheets of paper or fiber sheets (see sheet 125 in FIG. 2) including, for example: decorative paper, kraft paper, overlay paper, cellulose paper, foil, nylon, rayon, wood pulp, wood veneer, linen, fabric, or other papers or fibers for use in laminates or with resin 124. The sheet 125 allows the resin 124 to soak through the sheet 125 and also provide a structure for the resin 124 to cling to the top and bottom surfaces of the sheet 125. In numerous embodiments, the sheet 125 in the top-most resin binder layer 120 is a translucent paper or fiber (e.g., overlay paper or cellulose paper), which allows the resulting translucent top-most resin binder layer 120 to cover and protect a decorative paper layer 130 containing any one of various different colors or patterns on decorative papers (e.g., a printed decoration or pattern 132). In alternative embodiments, the sheet 125 in the top-most resin binder layer 120 is a decorative paper with no overlay paper, cellulose paper, or translucent papers or fibers placed over the decorative paper. A conventional resin binder layer (i.e., not a stainable resin binder layer 120) used as the top-most layer typically utilizes overlay paper in heavy duty use cases (because this provides additional scratch and wear protection above a decorative paper), and may utilize only the decorative paper (with no overlay paper) in light duty use cases.

The stainable laminate product 100 includes a stainable resin binder layer 120, and the stainable resin binder layer 120 is formed by saturating a sheet 125 with a resin 124 that contains at least one porosity agent 150. Porosity agents 150 that have been found to perform well are generally inert minerals that do not become fully saturated with the resin 124 or otherwise provide routes and pathways for a wood stain to seep through the porosity agents 150 down to ultimately stain the sheet 125. In numerous cases, the porosity agents 150 also do not substantially alter the curing times of the sheet 15 saturated with resin 124. A non-limiting list of porosity agents 150 includes: kaolin clay; crystalline silica; corn starch; talc; feldspar; titanium dioxide; mica; calcium carbonate; untreated silica particles; cellulosic particles; wax particles; Minex® from Unimin Corp. of New Canaan, CT; silicon dioxide; sodium oxide; aluminum oxide (if contained within a filler mixture such as Minex® fillers include Nepheline Syenite); calcium oxide; iron oxides; potassium oxide; precipitated calcium carbonate; wollastonite; silicate minerals; combinations thereof; or other minerals that would commonly be used in the production of paint and coatings; or other agents that result in a cured melamine surface having porous characteristics that enable a stain to penetrate into the resin binder layer 120. In some embodiments, the porosity agent 150 is a porous mineral. The porosity agents 150 may also be synthetic non-minerals or polymers that do not become fully saturated with the resin binder 124 or otherwise provide passage for the wood stain to reach the sheet 125 embedded in the resin binder layer 120. In some embodiments, a porosity agent 150 is: talc, feldspar, Minex®, calcium carbonate, silica (treated and untreated), or kaolin clay. In certain embodiments, a porosity agent 150 is: calcium carbonate or crystalline silica.

FIG. 2 illustrates a non-limiting example of a resin binder layer 120 including three different types of porosity agents 150, which are identified as a first porosity agent type 151, a second porosity agent type 152, and a third porosity agent type 153. For example, the first porosity agent type 151 may be feldspar, the second porosity agent type 152 might be Kaolin clay, and the third porosity agent type 153 may be crystalline silica. In the non-limiting example of FIG. 2, the material used for the sheet 125 has a sufficiently porous structure that both porosity agent types 151 and 152 saturate and penetrate into sheet 125, but the third porosity agent type 153 is too large or otherwise unable to penetrate into the sheet 125. Thus, the third porosity agent type 153 depicted in FIG. 2 is dispersed throughout the stainable resin binder layer 120 above and below the sheet 125, but not within the sheet 125. In some embodiments, the porosity agents 150 are not present within or do not substantially penetrate into the sheet 125.

The porosity agents 150 can contribute to creating a stainable laminate product 100 in a number of different ways. The porosity agents 150 distributed throughout the resin binder layer 120 provide a path for a stain to seep into and ultimately reach the sheet 125, where the sheet 125 then soaks in, distributes, and holds the stain. Additionally, the porosity agents 150 themselves can soak in stain and help add more of the stain color throughout the resin binder layer 120. Experiments have shown that deep and even stain penetration often occurs when the pigment volume concentration of the porosity agents 150 to the resin 124 reaches or exceeds the critical pigment volume concentration of the resin 124. The critical pigment volume concentration of the resin 124 often depends on the physical and chemical characteristics of the porosity agents 150 and how these characteristics interact with the resin 124. Thus, it is understood that the critical pigment volume concentration of the resin 124 will vary across different porosity agents 150. By way of example, if the sheet 125 in FIG. 2 is substantially translucent (e.g., overlay paper or cellulose paper), then allowing a non-opaque stain to seep into and color the sheet 125 will result in the decorative paper layer 130 showing through the stained resin binder layer 120. Stains that absorb well into the resin binder layer 120 will result in less amount of stain removing or being scratched off in tests such as a cross hatch adhesion tape test (e.g., following ASTM D 3359) or a nickel scratch test (applying a nickel at a 45° angle with 2 pounds of surface weight).

In some embodiments, the resin binder further comprises an additive, wherein at least one additive is selected from the group consisting of: a wetting agent, a release agent, and a catalyst. In some implementations, before curing, the volume percentage of the additive is between 0-5% of the volume of the resin binder formulation, or any percent range in between, for example, 0.1-4.5%, 0.2-4%, 0.3-3.5%, 0.3-2.8%, 0.5-3%, 0.5-2.8%, 0.5-2.6%, 0.6-3%, 0.6-2.5%, 0.7-2.6%, 0.7-2.5%, 0.7-2.4%, 0.7-2%, 0.8-2%, 0.8-1.5%, 0.9-2.4%, 0.9-2.2%, 0.9-1.5%, 0.9-1.1%, 1.1-2.2%, 1.1-2%, 1.3-2%, or 1.3-1.8%. In other implementations, before curing, the volume percentage of the additive is up to 10%, for example, up to 9%, up to 8%, up to 7%, up to 6%, up to 5%, up to 4%, up to 3%, up to 2.5%, up to 2%, up to 1.5%, up to 1%, or up to 0.5% of the volume of the resin binder formulation. In further implementations, before curing, the volume percentage of the additive is at least 0.5% of the volume of the resin binder formulation, for example, at least 0.6%, at least 0.7%, at least 0.8%, at least 0.9%, at least 1.0%, at least 1.1%, or at least 1.2% of the volume of the resin binder formulation.

A stainable laminate product 100 may also include a substrate 110. Resin presses may be used to press at least one stainable resin binder layer 120 (and optionally a decorative paper layer 130) onto a substrate 110, such as: kraft paper, backing layer(s), foil, porous panel product, wood, engineered wood, flooring, fabric, linen, fibrous sheets, cellulose, or other surfaces where melamine laminate layers are used. A substrate 110 may operate to provide structural strength to stainable resin binder layer(s) 120 (and the optional decorative paper layer 130) above the substrate 110.

In some embodiments, the substrate 110 comprises a porous panel product selected from the group consisting of: a particle board, a chip board, an oriented strand board (OSB), a medium-density fiberboard (MDF), a high-density fiberboard (HDF), a medium-density overlay (MDO), and a high-density overlay (HDO).

A stainable laminate product 100 containing a stainable resin binder layer 120 that includes porosity agents 150 may be formed using a number of different laminate pressing methods and processes including, but not limited to: liquid continuous press, high pressure laminate ("HPL") pressing, low pressure laminate pressing, thermally fused laminate ("TFL") (e.g., thermally fused melamine), direct pressed laminate, continuous press laminate, flexible continuous press laminate, or compact laminate pressing. In some embodiments, the stainable laminate product 100 is created using either an HPL process or a TFL process. Generally speaking, a TFL process uses higher temperatures and lower pressure than an HPL process. In addition, the TFL process typically omits underlying kraft paper and bonds the resin binder layer 120 (where sheet 125 is a decorative paper) directly onto the substrate 110.

Although many laminate products currently use a melamine-impregnated top-most layer (e.g., overlay paper(s) or decorative paper), the ability to make the top-most layer of a laminate product stainable by adding porosity agents 150 as disclosed is not limited to only layers impregnated with melamine resin 124. The disclosed porosity agents 150 may also be introduced in another thermosetting resin (whether used with or without a melamine resin 124) to create a layer that is capable of being stained with a wood stain or other stain when the resulting layer is partially or fully cured. For example, thermosetting resins including polyurethane resins, urea formaldehyde resins, polyester resins, or acrylic resins can also be used instead of a melamine resin. Polyester resins work well in TFL processes, but melamine resins are more common in TFL processes because polyester resins are more costly. This disclosure will generally refer to the disclosed process with respect to a primarily or exclusively melamine-impregnated layer, but the same process and disclosure will also work with at least one or more alternative thermosetting resins (unless expressly identified otherwise).

Example 2

Figures 3, 4:
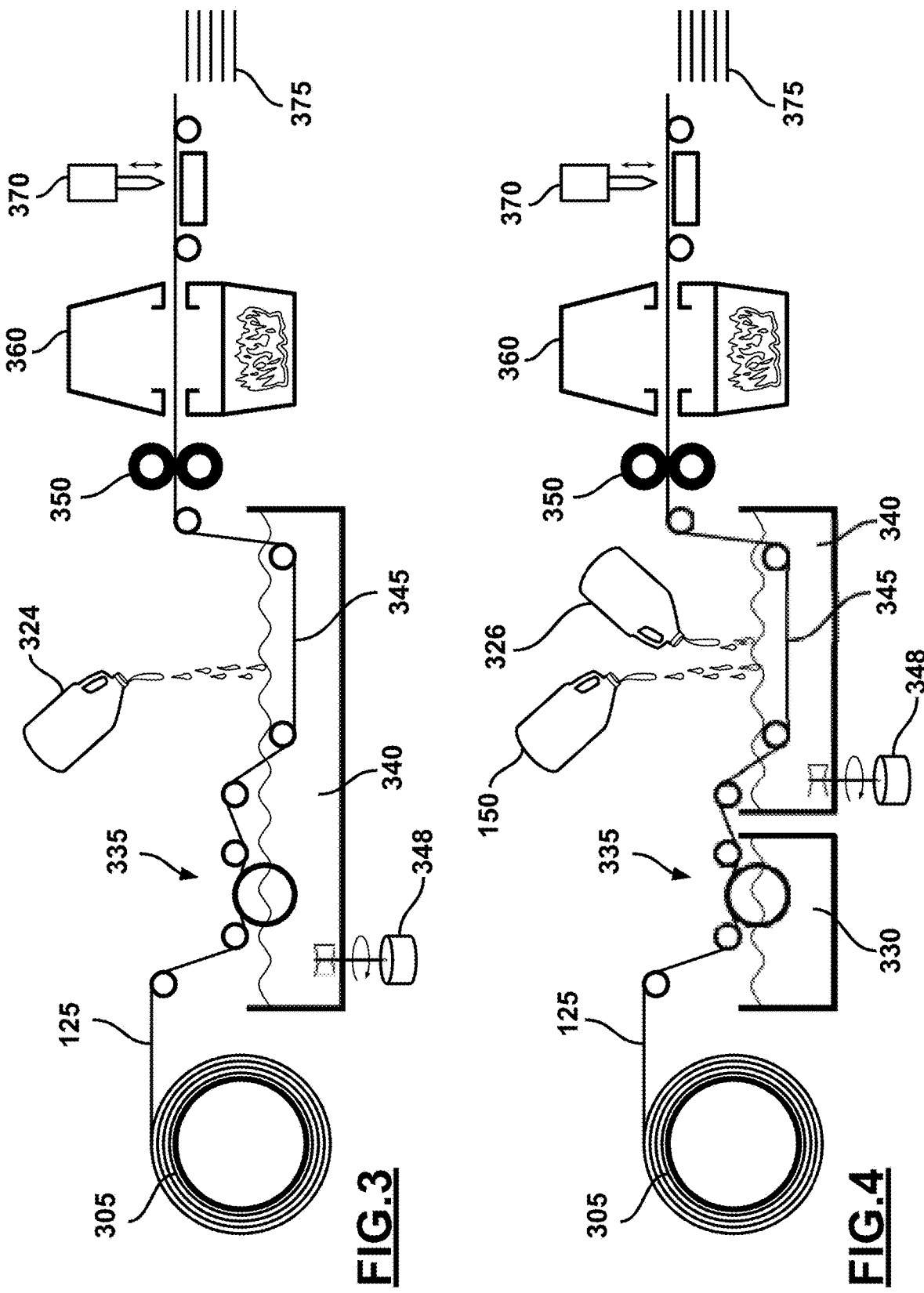
FIGS. 3-5 depict various non-limiting examples of processing a stainable laminate product.
Figure 5:
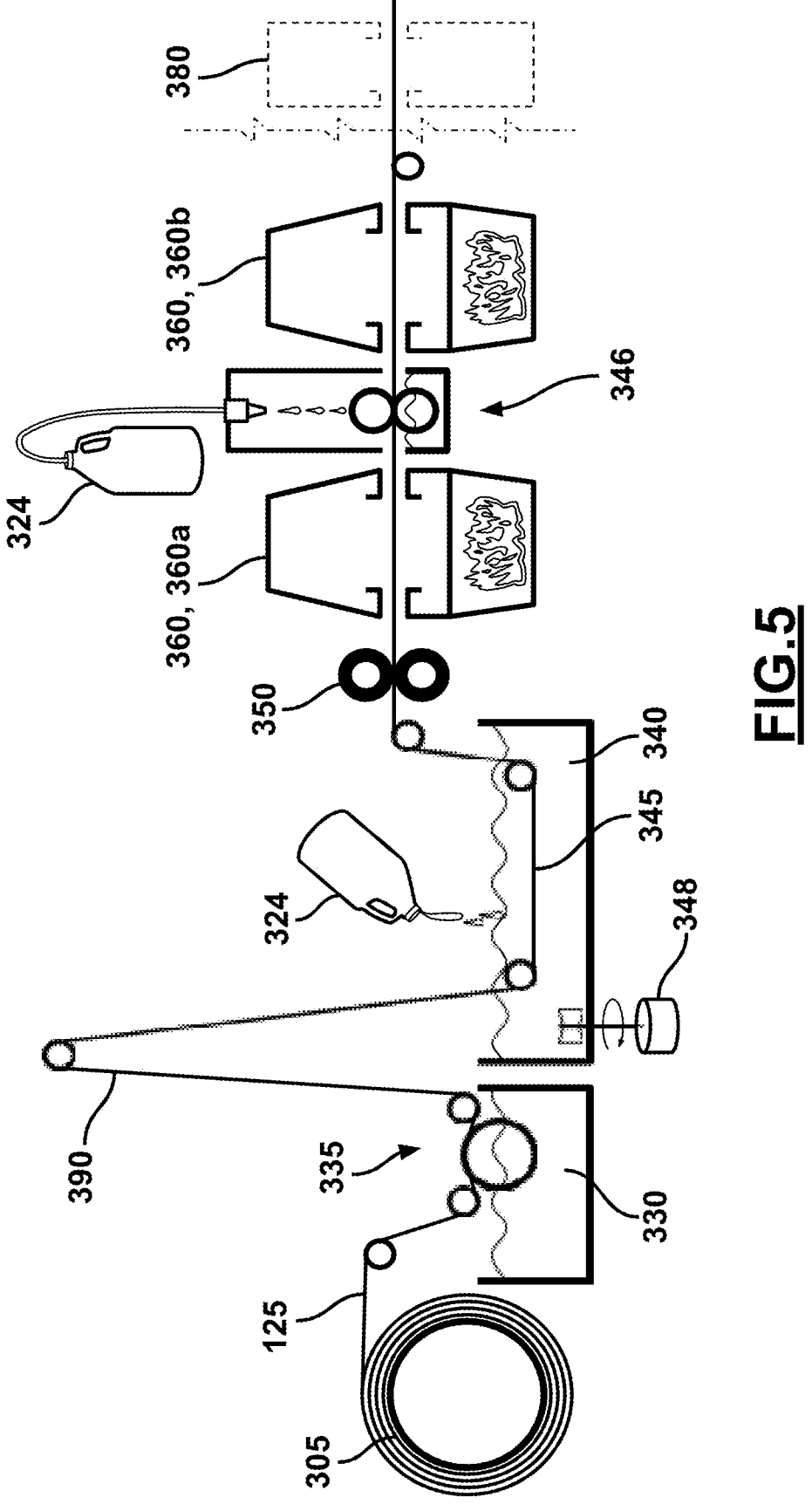

Processing Options for Manufacturing Stainable Laminate Wood or Wood Products FIGS. 3-5 depict various different processing options for impregnating and saturating porosity agents 150 and a resin 124 (and/or thermosetting acrylic resin) into a sheet 125. Because either a thermosetting polymer resin 124 or a thermosetting acrylic resin may be used, resin 324 will refer to both resins in the explanation of FIGS. 3-5. Impregnating a sheet 125 with resin 324 includes saturating the sheet 125 (e.g., a paper) in a saturation bath 340 of the resin 324. The sheet 125 (e.g., decorative paper, overlay paper, other paper, fabric, etc.) may be stored on a reel 305 that feeds the sheet 125 into the saturation bath 340 and through the curing oven(s) 360. A pre-wetting station 335 may be used to partially or lightly wet the sheet 125 with the resin 324 before completely saturating the sheet 125 in the resin saturation bath 340. The pre-wetting station 335 may be located in a separate pre-wetting bath 330 rather than in the main saturation bath 340 (compare FIG. 3 to FIGS. 4 and 5). In some embodiments, the pre-wetting bath 330 includes urea formaldehyde while the saturation bath 340 includes a melamine resin, a mixture of melamine resin and urea formaldehyde resin, or another suitable laminate resin. The pre-wet sheet 125 may be dried (but not cured), for example, using a sky roll 390 or other drying mechanism (see FIG. 5). After leaving the saturation step 345 in the resin saturation bath 340, the sheet 125 proceeds to a curing oven 360. Between the saturation bath 340 and the curing oven 360, a smoothing roll 350 may be used on the sheet 125 to remove excess resin 324 and smooth the sheet 125 before entering the curing oven 360. The sheet 125 in FIGS. 3 and 4 is shown as an example where the sheet 125 partially cures in the curing oven 360 (e.g., a multi-stage, multi-chamber, or variable temperature curing oven) and is then cut at a cutting station 370 and stacked or otherwise stored in curing racks 375 or other storage elements. A curing oven 360 and curing racks 375 will often only partially cure the sheet 125 saturated with resin 324 (e.g., curing to "B stage"), and the sheet 125 does not become fully cured until the sheet 125 undergoes a final heated pressing step where the sheet 125 is typically pressed together with additional sheets, porous panel products, and/or layers (e.g., decorative paper layer 130, kraft paper, overlay paper, backing layer 111, or substrate 110).

FIG. 5 depicts an alternative example where the sheet 125 is impregnated with porosity agents 150 and resin 324 twice: first in the main resin saturation bath 340, and then a second time at a second resin application step 346 positioned after the sheet 125 has partially, but not fully, cured in a first curing oven 360*a*. The porosity agents 150 included in resin 324 at the first saturation step 345 and the second application step 346 of resin 324 coating in FIG. 5 may use the same porosity agents 150 in both steps 345 and 346 in some implementations, but may also use different porosity agents 150 in each of steps 345 and 346. After the second resin application step 346, the sheet 125 is again partially cured (e.g., cured to "B stage") in a second curing oven 360*b* and may then optionally undergo additional processing 380.

The resin saturation bath 340 contains at least a resin 324 (e.g., melamine resin or a thermosetting resin) and porosity agents 150. The porosity agents 150 may be added to the resin 324 before being added to the saturation bath 340 (as shown in FIGS. 3 and 5). The porosity agents 150 may alternatively be added directly to the to the saturation bath 340 where a resin 324 that contains no porosity agents 150 is added separately to the saturation bath 340 (as shown in FIG. 4). One or more mixers or agitators 348 may be used to mix and stir the resin 324 and/or the resin saturation bath 340 to keep the porosity agents 150 mixed and suspended rather than settling towards the bottom. An agitator 348 may include paddles or blades as shown in FIGS. 3-5, but may also be a pump, a fluid circulation system, or other circulation, mixing, or agitation system.

In some embodiments, the method of creating the stainable laminate product comprises post application of a resin binder layer (e.g., a top-most layer that includes porosity agents) without saturating a sheet. Non-limiting examples of "post application" include using a mechanical application system such as a roll-coater, curtain coater, or spray application method. In preferred embodiments, the coating system contains a high percentage of porosity agents in order to allow a stain to absorb, thus allowing color retention. In non-limiting implementations, the porosity agent is in a volume percent between 20-60%.

Example 3

Pressing Processes for Manufacturing Stainable Laminate Wood or Wood Products

Figure 6:
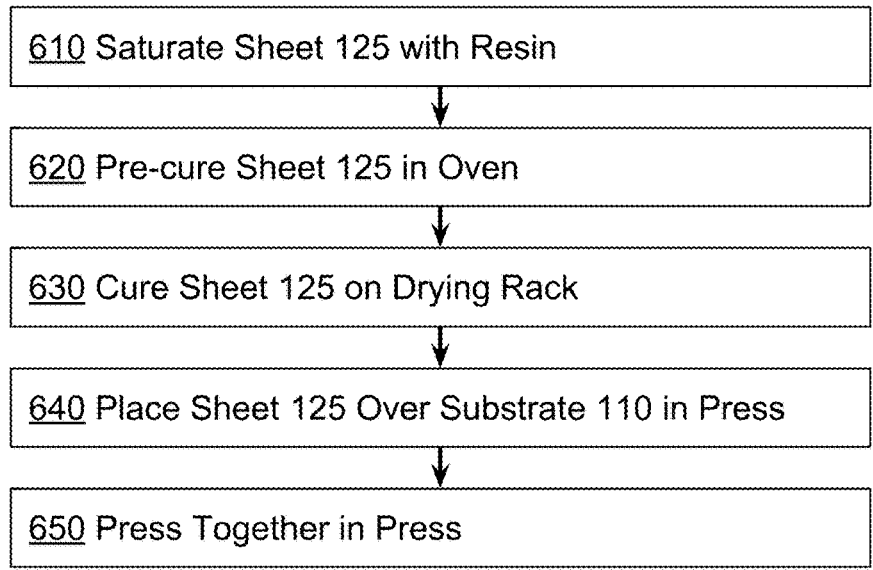
FIGS. 6-7 depict various non-limiting examples of a method of creating a stainable laminate product.
Figures 8, 9:
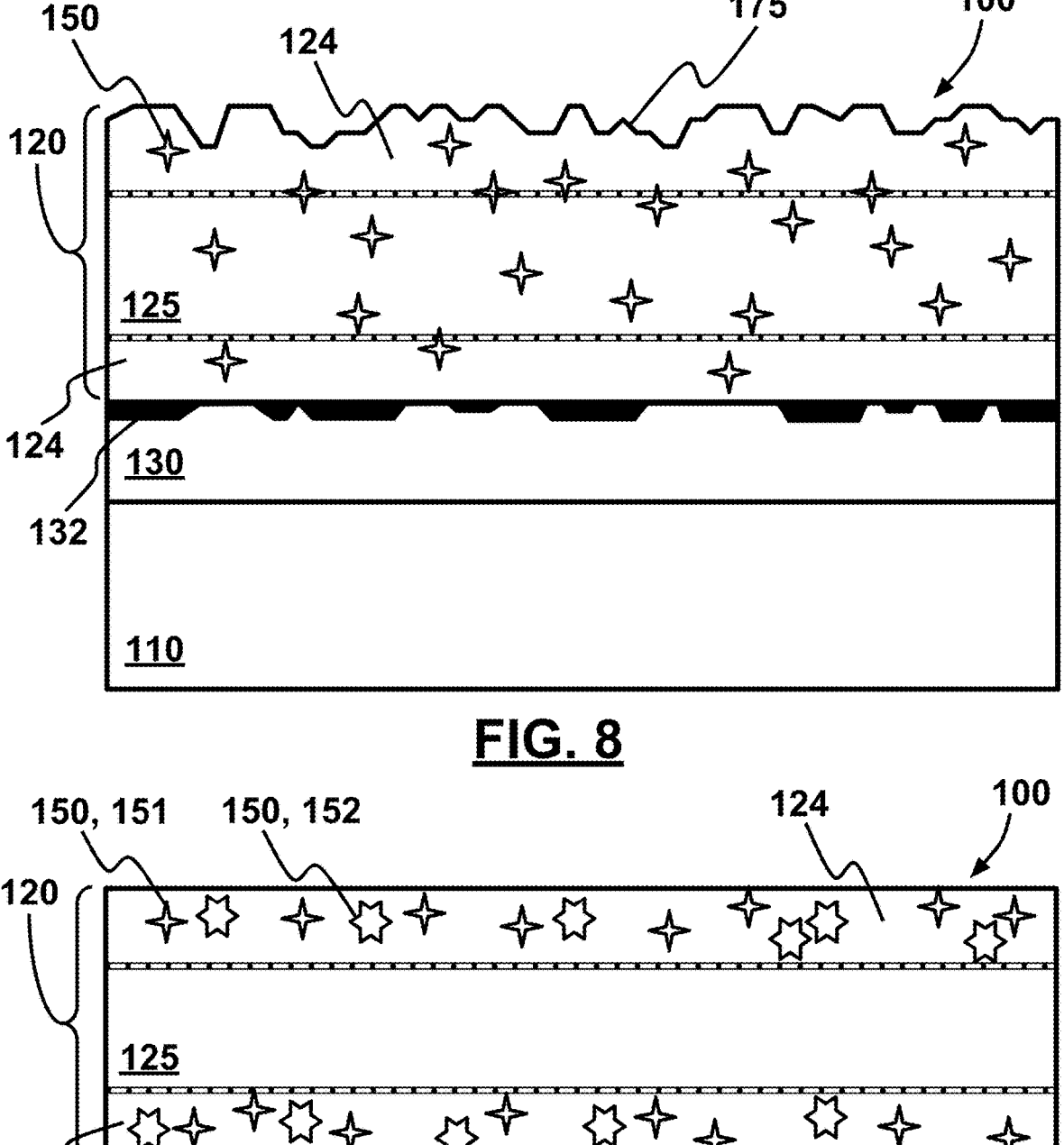
FIGS. 8-13 depict various non-limiting examples of a stainable laminate product.

FIG. 6 provides a non-limiting example of a stainable laminate product 100 created using a thermally fused laminate (TFL) process. A sheet 125 is saturated 610 with resin binder containing at least one porosity agent 150. In this non-limiting example, the sheet 125 is a decorative paper without a translucent overlay paper above the decorative paper (although the TFL process is not limited to only decorative papers as sheet 125). The sheet 125 next enters an oven to be pre-cured 620 (e.g., at 150-170° C. for 40-180 seconds). The sheet 125 is then placed on a drying or storage rack to finish curing 630. The sheet 125 then is placed over 640 a substrate 110 inside a press, where the substrate 110 is a porous panel product that is at least 4 mm thick (e.g., MDF or HDF instead of kraft paper or other thin substrates). Next the press uses temperature and pressure to press 650 the sheet 125 directly to the substrate 110 (e.g., at 165-190° C. for 0.3-4 minutes under 175-400 pounds-per-square-inch (psi) of pressure). FIG. 9 illustrates an example of a stainable laminate product 100 where the layers illustrated could have been formed using the TFL process as described in FIG. 6 (but FIG. 9 may also be created using other processes aside from a TFL process).

Figure 7:
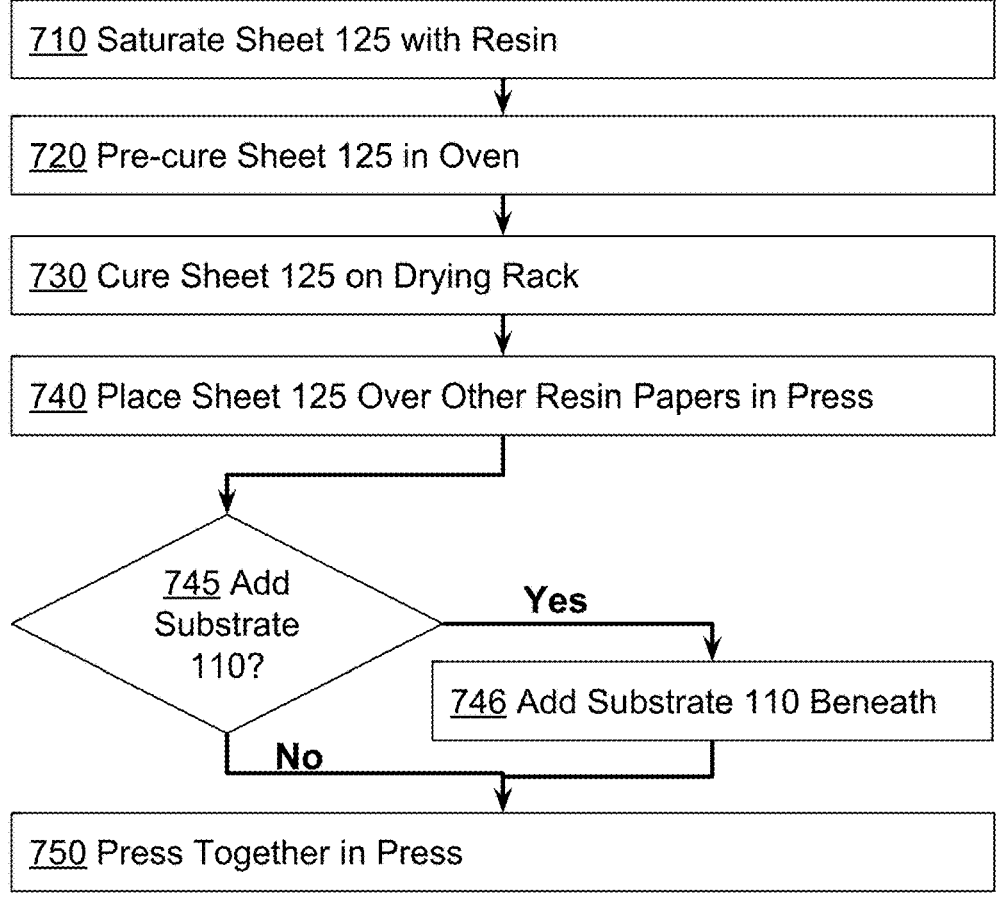
Figures 10, 11:
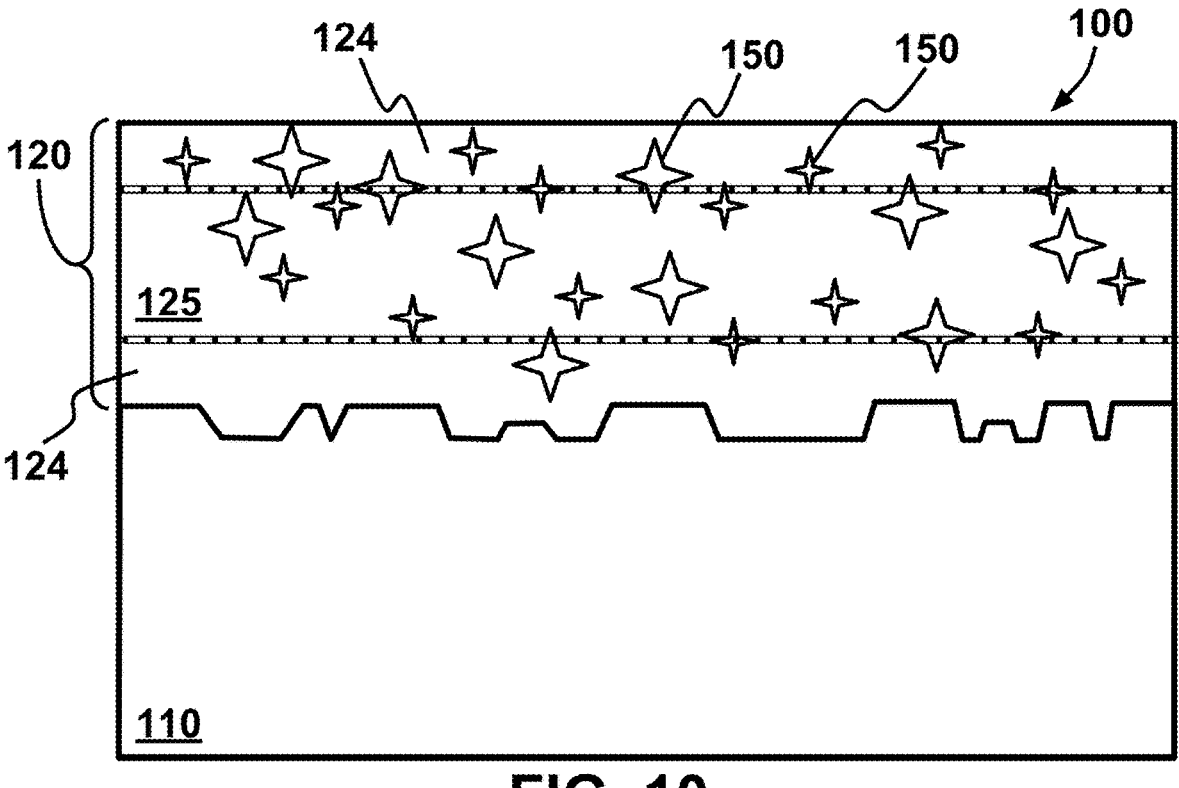

FIG. 7 provides a non-limiting example of a stainable laminate product 100 created using a high pressure laminate (HPL) process. A sheet 125 is saturated 710 with resin binder containing at least one porosity agent 150. In this non-limiting example, the sheet 125 is a translucent overlay paper (although the HPL process is not limited to only overlay paper as sheet 125). The sheet 125 next enters an oven to be pre-cured 720 (e.g., at 260-300° C. for 100-150 seconds). The sheet 125 is then placed on a drying or storage rack to finish curing 730. The sheet 125 then is placed 740 in a press over other layers of cured resin saturated papers, which include a resin saturated decorative layer and at least one resin saturated layer of kraft paper (these lower layers do not contain porosity agents 150 in this example). In some embodiments (i.e., "yes" in 745), this stack of sheet 125 and other paper sheets is also positioned 746 on top of a substrate 110 inside the press, where the substrate 110 is a porous panel product that is at least 4 mm thick (e.g., MDF or HDF instead of kraft paper or other thin substrates). Finally, the press uses temperature and pressure to press 750 the sheet 125 onto the underlying sheets of decorative paper, kraft paper, and optionally a substrate 110 (e.g., at 250-300° C. for 5-60 minutes under 800-1200 psi of pressure). FIG. 11 illustrates an example of a stainable laminate product 100 where the layers illustrated could have been formed using the HPL process as described in FIG. 7 (but FIG. 11 may also be created using other processes aside from an HPL process).

Example 4

Porosity Agents

A non-limiting list of porosity agents 150 includes: kaolin clay; crystalline silica (e.g., microcrystalline silica, untreated silica, treated silica, and silicate minerals); corn starch; talc; feldspar; titanium dioxide; mica; calcium carbonate (e.g., precipitated calcium carbonate); cellulosic particles; wax particles; Minex® from Unimin Corp. of New Canaan, CT; silicon dioxide; sodium oxide; silane; aluminum oxide (if contained within a filler mixture such as Minex® fillers including Nepheline Syenite); calcium oxide; iron oxides; potassium oxide; precipitated calcium carbonate; wollastonite; combinations thereof; or other minerals that would commonly be used in the production of paint and coatings; or other agents that result in a cured resin binder surface having porous characteristics that enable a stain to penetrate into the resin binder layer 120. In some embodiments, the porosity agent 150 is a porous mineral. The porosity agents 150 may also be synthetic non-minerals or polymers that do not become fully saturated with the resin 124 or otherwise provide passage for the wood stain to reach the sheet 125 embedded in the resin binder layer 120. In some embodiments, at least one porosity agent 150 is selected from the group consisting of: talc, feldspar, Minex®, calcium carbonate, crystalline silica, silica (treated and untreated), or kaolin clay. In certain embodiments, a porosity agent 150 is: feldspar or Minex®. In other embodiments, the porosity agent 150 comprises calcium carbonate, crystalline silica, and talc. In yet other embodiments, the porosity agent 150 comprises calcium carbonate and crystalline silica. In other embodiments, the porosity agent 150 comprises crystalline silica and talc.

In non-limiting embodiments, the amount of the porosity agent 150 added to the resin binder formulation 324 (with the resin 124 that comprises either the thermosetting polymer resin, the thermosetting acrylic resin, or a combination of the thermosetting polymer resin and the thermosetting acrylic resin) is between 15% and 80% of the total formulation weight of the saturation resin 324 (e.g., 124), or any percent range in between, e.g., 20-80%, 20-70%, 20-65%, 25-80%, 25-70%, 25-65%, 25-60%, 30-80%, 30-70%, 30-60%, 30-55%, 35-80%, 35-75%, 35-70%, 35-55%, 35-50%, 40-80%, 40-75%, 40-70%, 40-50%, 40-45%, 45-80%, 45-70%, 45-65%, 50-80%, 50-70%, 50-65%, 50-60%, 55-80%, or 55-60%. In some embodiments, one or more of silane, organosilane, or polyvinyl butyral are added to the saturation resin 324 (e.g., 124) to reduce the amount of porosity agents 150 required by, typically, 1-30%, e.g., at least 1%, 5%, 10%, 15%, 20%, etc.

In some implementations, the amount of porosity agents 150 (e.g., untreated silica particles, wax particles, mica, calcium carbonate, talc, silane, kaolin clay, crystalline silica, corn starch, feldspar, titanium dioxide, cellulosic particles, combinations thereof, etc.) added to the saturation resin 324 formulation (e.g., melamine resin 124) is between 15% and 65% of the total formulation weight of the saturation resin 324 (e.g., 15-65%, 15-60%, 15-55%, 25-65%, 35-65%, 40-65%, 35-60%, or any other range between 5% and 65%). In some implementations, the amount of porosity agents 150 added to a melamine resin 124 is between 35% and 80% of the total formulation weight of the melamine resin 124 (e.g., 35-80%, 35-70%, 45-55%, 35-65%, 40-60%, 40-65%, 45-70%, or any other range between 35% and 80%). The amount of porosity agents 150 added to the melamine resin 124 formulation in certain implementations is between 30% and 60% of the total formulation weight of the melamine resin 124. In addition, the amount of porosity agents 150 added to a thermosetting acrylic resin formulation may also be between 30% and 80% of the total formulation weight of the thermosetting acrylic resin (which may or may not also include melamine resin 124). In some embodiments, one or more of silane, organosilane, or polyvinyl butyral are added to the saturation resin 324 or melamine resin 124 to reduce the amount of porosity agents 150 required by 1-30%, e.g., at least 1%, 5%, 10%, 15%, 20%, etc.

In other embodiments, before curing, the porosity agent 150 comprises between 30-75% of the weight of the resin binder formulation 324 (e.g., 124), or any percent range in between, for example, 30-70%, 30-65%, 30-60%, 35-75%, 35-70%, 35-65%, 35-60%, 35-55%, 35-50%, 40-70%, 40-65%, 40-60%, 40-55%, 40-50%, 45-65%, 45-60%, 50-60%, or 40%-46%. In some implementations, before curing, the porosity agent 150 comprises at least 30%, for example, at least 35%, at least 40%, at least 45%, at least 50%, at least 55%, at least 60%, at least 65%, at least 70% of the weight of the resin binder formulation 324 (e.g., 124).

In other embodiments, after curing, the porosity agent 150 comprises between 40-85% of the weight of the resin binder formulation 324 (e.g., 124), or any percent range in between, for example, 40-80%, 45-80%, 45-75%, 50-75%, 50-70%, 55-75%, 55-70%, 55-65%, 60-70%, or 58-62%. In some implementations, after curing, the porosity agent 150 comprises at least 40%, for example, at least 45%, at least 50%, at least 55%, at least 60%, at least 65%, at least 70%, at least 75%, at least 80% of the weight of the resin binder formulation.

Some experiments resulted in a wood stain not taking hold in a stainable resin binder layer 120 until the amount of porosity agents 150 reached nearly 50% of the formulation weight of the resin 124. In spite of the significant amount of porosity agents present in the resin 124, these experiments resulted in a stainable resin binder layer 120 that adhered well to the underlying substrate 110. In some embodiments, the amount of porosity agents 150 added to the resin 124 formulation is between 40% and 60% of the total weight, or preferably 45%±5% of the formulation weight of the resin 124.

The pigment volume concentration (PVC) is very important in the overall functionality of the system to become absorbent. In non-limiting embodiments, the pigment volume concentration (PVC) is between 25-80%, or any percent range in between, for example, 25-75%, 25-70%, 25-65%, 25-60%, 25-55%, 30-80%, 30-75%, 30-70%, 30-65%, 30-60%, 30-55%, 35-80%, 35-75%, 35-70%, 35-65%, 35-60%, 35-55%, 40-80%, 40-75%, 40-70%, 40-65%, or 40-60%, etc.

In some implementations, the porosity agent 150 is selected based on high absorbency. For example, microcrystalline silica has a high absorbency and is relatively fine (typically ranges from 1.5 μm to 5 μm or any number range in between, e.g., 1.5-4.6 μm, 1.5-4.2 μm, 1.6-3.8 μm, 1.7-3.8 μm, 1.7-3.4 μm, 1.8-3.4 μm, 1.8-3 μm, 1.9-3 μm, 1.9-2.6 μm, 2-2.6 μm, or 2-2.2 μm). Also, certain types of talc have a chemical structure that is flat and platy and that structure also creates high absorbency due to its high surface area per weight. In some implementations, the porosity agent 150 is selected based on high loading which leads to cost-saving. For example, certain types of calcium carbonate have a medium range absorbency, but is a small particle allowing for high loading (typically ranges from 10 μm to 15 μm, or any number range in between, e.g., 10-14 μm, 10.1-13.5 μm, 10.2-13 μm, 10.3-13 μm, 10.3-12.5 μm, 10.4-12.5 μm, 10.4-12 μm, 10.5-12 μm, or 10.5-11.5 μm). Calcium carbonate increase the pH of the formulation, which could create an issue with the acid catalyst that forms the film of the resin binder. To address this issue, in some implementations where calcium carbonate is use (alone or together with a second porosity agent such as microcrystalline silica), the catalyst amount is increased by 5-15% by weight. In other implementations, calcium carbonate is replaced, either completely or partially, by a grade of talc to address the issue.

The total amount of porosity agents 150 ranging from 5% to 65% of the total formulation weight of the resin 324 (e.g., melamine resin 124 and/or thermosetting acrylic resin) may be comprised of a single porosity agent 150 or multiple porosity agents 150 (e.g., a first porosity agent type 151, a second porosity agent type 152, and a third porosity agent type 153). Different types of porosity agents 150 may be used together (e.g., silica, talc, and Kaolin clay within the same formulation). Different varieties within the same type of porosity agents 150 may be used together (e.g., two or more different varieties of kaolin clay within the same formulation). Different sizes of one or more types of porosity agents 150 may be used together (e.g., talc of 5-10 μm used with talc of 35-45 μm; mica of 10-20 μm used with talc of 30-40 μm; or other combinations of sizes). Different densities of one or more types of porosity agents 150 may be used together (e.g., cellulosic particles of about 1.1 g/cm³ used with cellulosic particles of about 1.6 g/cm³; cellulosic particles of about 1.5 g/cm³ used with talc of about 2.8 g/cm³; or other combinations of densities). Accordingly, a single formulation of resin 324 (e.g., melamine resin 124 and/or thermosetting acrylic resin) may contain numerous different types, varieties of the same type, sizes, or densities of porosity agents 150 within the resin 324 formulation.

In some implementations, the particle size of the porosity agents 150 ranges from 0.01 μm to 110 μm, or any other number range in between (e.g., 0.01-100 μm, 0.01-90 μm, 0.01-85 μm, 0.01-75 μm, 0.01-60 μm, 0.01-50 μm, 0.01-35 μm, 1-85 μm, 1-75 μm, 1-45 μm, 1-35 μm, 1.5-5 μm, 1.5-4.6 μm, 1.5-4.2 μm, 1.6-42. μm, 1.6-3.8 μm, 1.7-3.8 μm, 1.8-3.4 μm, 1.8-3 μm, 1.9-3 μm, 1.9-2.6 μm, 2-2.6 μm, 2-2.2 μm, 10-70 μm, 10-60 μm, 10-15 μm, 10-14 μm, 10.1-13.5 μm, 10.2-13 μm, 10.3-13 μm, 10.3-12.5 μm, 10.4-12.5 μm, 10.4-12 μm, 10.5-12 μm, 10.5-11.5 μm, 15-50 μm, 20-65 μm, 20-60 μm, 25-65 μm, 30-60 μm, 30-55 μm, 35-55 μm, 35-50 μm, 40-50 μm, or 40-45 μm). In certain implementations, the particle size of the porosity agents 150 ranges from 1 μm to 85 μm. In some implementations, the particle size of the porosity agents 150 ranges from 1 μm to 50 μm. In certain implementations, the particle size of talc porosity agents 150 ranges from 1 μm to 50 μm. In some implementations, the particle size of wax porosity agents 150 (e.g., micronized organic polymer waxes) ranges from 1 μm to 40 μm.

In non-limiting embodiments, the typical amount of the one or more porosity agents 150 is between 25-175 grams per square meter (gsm) of the substrate, or any number range in between, for example, 25-105 gsm, 31-175 gsm, 35-170 gsm, 35-160 gsm, 45-170 gsm, 45-165 gsm, 45-155 gsm, 55-175 gsm, 55-165 gsm, 55-160 gsm, 55-145 gsm, 60-175 gsm, 60-145 gsm, 70-175 gsm, 70-130 gsm, 80-175 gsm, 80-125 gsm, 80-115 gsm, 85-175 gsm, 85-170 gsm, 85-115 gsm, 85-110 gsm, 90-175 gsm, 90-170 gsm, 90-165 gsm, 90-110 gsm, 90-105 gsm, 100-175 gsm, 100-165 gsm, 100-160 gsm, or 95-105 gsm. In some implementations, the amount of the porosity agent typically ranging in size from 10-15 μm (e.g., calcium carbonate) is between 20-11 gsm of the substrate, or any number range in between, for example, 30-110 gsm, 30-100 gsm, 40-100 gsm, 40-90 gsm, 50-90 gsm, 50-80 gsm, 40-110 gsm, 50-110 gsm, or 60-110 gsm. In other implementations, the amount of the porosity agent typically ranging in size from 1.5-5 μm (e.g., microcrystalline silica) is between 10-80 gsm of the substrate, or any number range in between, for example, 20-75 gsm, 20-70 gsm, 30-70 gsm, 30-65 gsm, 40-65 gsm, 40-80 gsm, 45-80 gsm, 50-80 gsm, or 50-75 gsm.

In some implementations, the density of the porosity agents 150 ranges from 0.5 g/cm$^3$ to 4.5 g/cm$^3$, or any other number range in between (e.g., 0.5-4.5 g/cm$^3$, 0.9-3.8 g/cm$^3$, 1.0-3.5 g/cm$^3$, 0.8-4.1 g/cm$^3$, 0.8-3.5 g/cm$^3$, 1.2-3.2 g/cm$^3$, 0.5-4.5 g/cm$^3$). In certain implementations, the density of the porosity agents 150 ranges from 0.8 g/cm$^3$ to 3.5 g/cm$^3$. In some implementations, the density of the porosity agents 150 ranges from 1.2 g/cm$^3$ to 3.2 g/cm$^3$.

In some embodiments, the porosity agent 150 comprises multiple porosity agents, e.g., a first porosity agent type 151, a second porosity agent type 152, and a third porosity agent type 153. Different types of porosity agents 150 may be used together, e.g., silica, talc, and Kaolin clay within the same formulation. Different varieties within the same type of porosity agents 150 may be used together, e.g., two or more different varieties of kaolin clay within the same formulation. Different sizes of one of more types of porosity agents may be used together, e.g., talc of 5-10 μm used with talc of 35-45 μm; mica of 10-20 μm used with talc of 30-40 μm; or other combinations of sizes. Different densities of one or more type of porosity agents 150 may be used together, e.g., cellulosic particles of about 1.1 g/cm$^3$ used with cellulosic particles of about 1.6 g/cm$^3$; cellulosi particles of about 1.5 g/cm$^3$ used with talc of about 2.8 g/cm$^3$; or other combinations of densities. Accordingly, a single formulation of resin binder 324 (resin 124 comprising thermosetting acrylic resin, thermosetting polymer resin, or a combination of thermosetting acrylic resin and thermosetting polymer resin) may contain different types or varieties of the same type (with different sizes or densities) of porosity agents 150 within the resin binder formulation.

In some embodiments, the first porosity agent is calcium carbonate, the second porosity agent is microcrystalline silica, and the weight ratio between calcium carbonate and microcrystalline silica is 3:1-0.3:1 or any ratio range in between, for example, 3:1-1:3, 3:1-1:2.5, 3:1-1:2, 3:1-1:1.5, 3:1-1:1, 3:1-2:1, 2.5:1-1:3, 2.5:1-1:2.5, 2.5:1-1:2, 2.5:1-1:1.5, 2.5:1-1:1, 2.5:1-2:1, 2:1-1:3, 2:1-1:2.5, 2:1-1:2, 2:1-1:1.5, 2:1-1:1, 1.5:1-1:3, 1.5:1-1:2.5, 1.5:1-1:2, or 1.5:1-1:1. In some implementations, the weight ratio between calcium carbonate and microcrystalline silica is about 4:1, about 3:1, about 2:1, about 1.9:1, bout 1.8:1, about 1.7:1, about 1.6:1, about 1.5:1, about 1.4:1, about 1.3:1, about 1.2:1, about 1:1, about 1:1.5, or about 1:2. In other implementations, before curing, calcium carbonate comprises between 20-35% of the weight of the resin binder formulation, for example, 20-32%, 22-30%, 22-28%, 25-28%, or 22-25%. In further implementations, before curing, microcrystalline silica comprises between 15-25% of the weight of the resin binder formulation, for example, 15-22%, 18-22%, 19-22%, or 19-21%. In specific non-limiting implementations, before curing, calcium carbonate and microcrystalline silica comprise about 30% (e.g., between 28-32% or between 29-31%) and about 20% (e.g., between 18-22% or between 19-21%) of the weight of the resin binder formulation, respectively.

In some embodiments, the first porosity agent is calcium carbonate, the second porosity agent is microcrystalline silica, and the third porosity agent is talc. In some implementations, before curing, calcium carbonate comprises between 15-25% of the weight of the resin binder formulation, for example15-22%, 18-22%, 19-22%, or 19-21%. In other implementations, before curing, microcrystalline silica comprises between 15-25% of the weight of the resin binder formulation, for example, 15-22%, 18-22%, 19-22%, or 19-21%. In further implementations, before curing, talc comprises between 5-15% of the weight of the resin binder formulation, for example, 5-12%, 8-12%, 9-12%, or 9-11%. In a specific non-limiting implementation, calcium carbonate comprises about 20% (e.g., between 18-22% or between 19-21%) of the weight of the resin binder formulation; microcrystalline silica comprises about 20% (e.g., between 18-22% or between 19-21%) of the weight of the resin binder formulation; talc comprises about 10% (e.g., between 8-12% or between 9-11%) of the weight of the resin binder formulation.

Porosity agents 150 generally increase the overall mass of the resin binder layer 120. For example, conventional resin processing may result in 70-100 grams per square meter being added or picked up by the paper. That is, conventional resin processing often has a "pick up weight" of between 10 and 100 grams per square meter ("gsm"). In contrast, the disclosed resin 124 including porosity agents 150 has resulted in pick up weights ranging from 100 to 240 grams per square meter or any number range in between. In some non-limiting embodiments, the pick up weight of the resin binder layer 120 is between 100 and 240 grams per square meter, or any number range in between (e.g., 110-230 gsm, 120-215 gsm, 110-180 gsm, or 130-215 gsm). In some embodiments, the pick up weight of the resin binder layer 120 is between at least 110 grams per square meter (e.g., at least 110, 120, 125, 130, 140, 150, or 170 gsm).

The size and density of the porosity agents 150 will affect the depth of impregnation or saturation into the resin binder layer 120 and also the sheet 125 within the resin binder layer 120. The resin 124 (e.g., a thermosetting polymer resin, a thermosetting acrylic resin, or a combination of a thermosetting polymer resin and a thermosetting acrylic resin) is impregnated into one or more sheets 125 of paper (e.g., kraft paper, decorative paper, overlay paper, etc.), fabric, linen, or fibrous material where the porosity and saturation properties of the sheet 125 can affect the depth and manner of how different porosity agents 150 embed themselves within the sheet 125. In some implementations, the sheet 125 of paper or other medium is manufactured with sufficient porosity to allow the porosity agents 150 to penetrate into and throughout the sheet 125. Porosity agents 150 with higher densities within the disclosed ranges will tend to have the ability to impregnate deeper within the sheet 125 provided these dense particles are sufficiently small to pass into interior portions of the sheet 125. Porosity agents 150 that are larger than the openings on the surface of and within the sheet 125 will not saturate deep into the sheet 125 and will rest on or close to the surface of sheet 125. Thus, the porosity and structure of a sheet 125 of paper (or other medium) can be combined with particular sizes and densities of porosity agents 150 to result in a melamine layer 120 impregnated with porosity agents 150 at uniform or varying amounts depending on the depth.

In some implementations, additional of calcium carbonate to the resin binder requires that the amount of an acid catalyst be increased by 5-15%, by weight. Calcium carbonate increases the pH of the formulation, thus reduces the activity of the acid catalyst. Without the additional catalyst, the press cycle time has to be increase from, for example, 14-18 seconds to 45 seconds. Without the compensation, the longer pressing time would give melamine more time to flow to the surface and reduce the overall absorbency of the panel.

The porosity agents 150 (e.g., untreated silica particles, wax particles, mica, calcium carbonate, talc, silane, kaolin clay, crystalline silica, corn starch, feldspar, titanium dioxide, calcium oxide, wollastonite, cellulosic particles, combinations thereof, etc.) are added to the resin 324 (e.g., thermosetting polymer resin 124 and/or a thermosetting acrylic resin) before the resin 324 becomes fully reacted and rigid. The porosity agents 150 may be added to the resin 324 formulation before a catalyst is added. The porosity agents 150 may also be added to the resin 324 formulation after a catalyst is added, but before the resin 324 becomes fully reacted and rigid. Talc and untreated silica particles are preferable porosity agents 150 in some implementations for their absorption characteristics. In other embodiments, calcium carbonate and microcrystalline are preferrable porosity agents 150 for their characteristics. In some implementations, at least two different types of porosity agents 150 are included in the resin 324 formulation before pressing and curing the melamine layer 120.

Existing resin binder presses may be used to press at least one stainable melamine layer 120 onto a substrate 110, such as: kraft paper, decorative paper, backing layer(s), foil, porous panel product, wood, engineered wood, flooring, fabric, linen, fibrous sheets, cellulose, or other surfaces where melamine laminate layers are used. Existing resin binder presses may be used, for example, by including porosity agents 150 to the resin 124 formulation 124 (a thermosetting polymer resin, a thermosetting acrylic resin, or a combination of a thermosetting polymer resin and a thermosetting acrylic resin) before pressing and curing the resin binder layer 120 in the resin binder press. The porosity agents 150 may be added to a resin 124 formulation that is then pressed using either textured or non-textured pressing plates (e.g., caul plates) using any one of a variety of laminate pressing methods. The resin binder layer 120 containing the porosity agent(s) 150 results in a stainable resin binder layer 120 where a wood stain, colorant, or stain can embed itself into the stainable resin binder layer 120 because of the porosity provided by the porosity agent(s) 150.

After staining the stainable resin binder layer 120, a finishing coating may be applied on top to seal the porous (and stainable) top resin binder layer 120 of the stainable laminate product 100. Failing to seal and apply a finishing coating to the stainable laminate product 100 creates the risk of accidentally staining the stainable resin binder layer 120 with food, dirt, or other contaminants. Thus, the stainable laminate product 100 behaves similar to a traditional wood product that is sealed after being stained to prevent inadvertent staining in the future.

Referring generally to FIGS. 8-13, a stainable resin binder layer 120 including at least one porosity agent 150 (e.g., untreated silica particles, wax particles, mica, talc, etc.) may be affixed to a substrate 110, such as: a backing layer, a porous panel product, or other natural or synthetic substrate products as described throughout this disclosure. The stainable resin binder layer 120 includes porosity agents 150 and resin 124 (a thermosetting polymer resin, a thermosetting acrylic resin, or a combination of a thermosetting polymer resin and a thermosetting acrylic resin) impregnated in any one of a variety of different sheets 125 including, for example: decorative paper, kraft paper, overlay paper, cellulose paper, foil, nylon, rayon, wood pulp, wood veneer, linen, fabric, or other papers or fibers for use in laminates or with resin 124. The stainable resin binder layer 120 may be affixed to a variety of products that conventionally use wood stains (e.g., cabinetry, wood products, flooring, siding, furniture, shelving, etc.) and products that do not currently use wood stains (e.g., staining a non-wood product or using a non-traditional stain on wood or non-wood products). In certain preferred implementations, the stainable resin binder layer 120 is affixed to porous panel products, cabinetry, furniture materials, boards, flooring, or engineered wood products. A stainable resin binder layer 120 that has been partially or fully cured may be postformed into various curved or bent shapes.

The resin binder layer 120 may contain two or more different types of porosity agents 150 mixed in varying amounts depending on the implementation. The resin binder layer 120 may contain a single type of porosity agent 150 (see FIG. 8), two different types of porosity agents 150 (see FIG. 9), three different types of porosity agents 150 (see FIGS. 2 & 11), or four or more different types of porosity agents 150 (not shown). For example, the stainable laminate product 100 shown in FIG. 2 may include the following combination of porosity agents 150 (by volume of just the porosity agents 150): 55% untreated silica particles; 20% wax particles; and 25% mica. The stainable resin binder layer 120 may also contain more than one size of the same type of porosity agent 150, such as: different sizes of a single porosity agent 150 (see FIG. 10); different sizes of each porosity agent 150 within a resin binder layer 120 having multiple types of porosity agents 150 (not shown); or different sizes of a single porosity agent 150 within a resin binder layer 120 having multiple types of porosity agents 150 (not shown). In some implementations, the sheet 125 in resin binder layer 120 is impregnated with between 4 and 8 different types of porosity agents 150. Any combination of different types, amounts (by volume or weight), and/or sizes of the disclosed porosity agents 150 and their equivalents may be used within at least one resin binder layer 120 of the stainable laminate product 100.

Figures 12, 13:
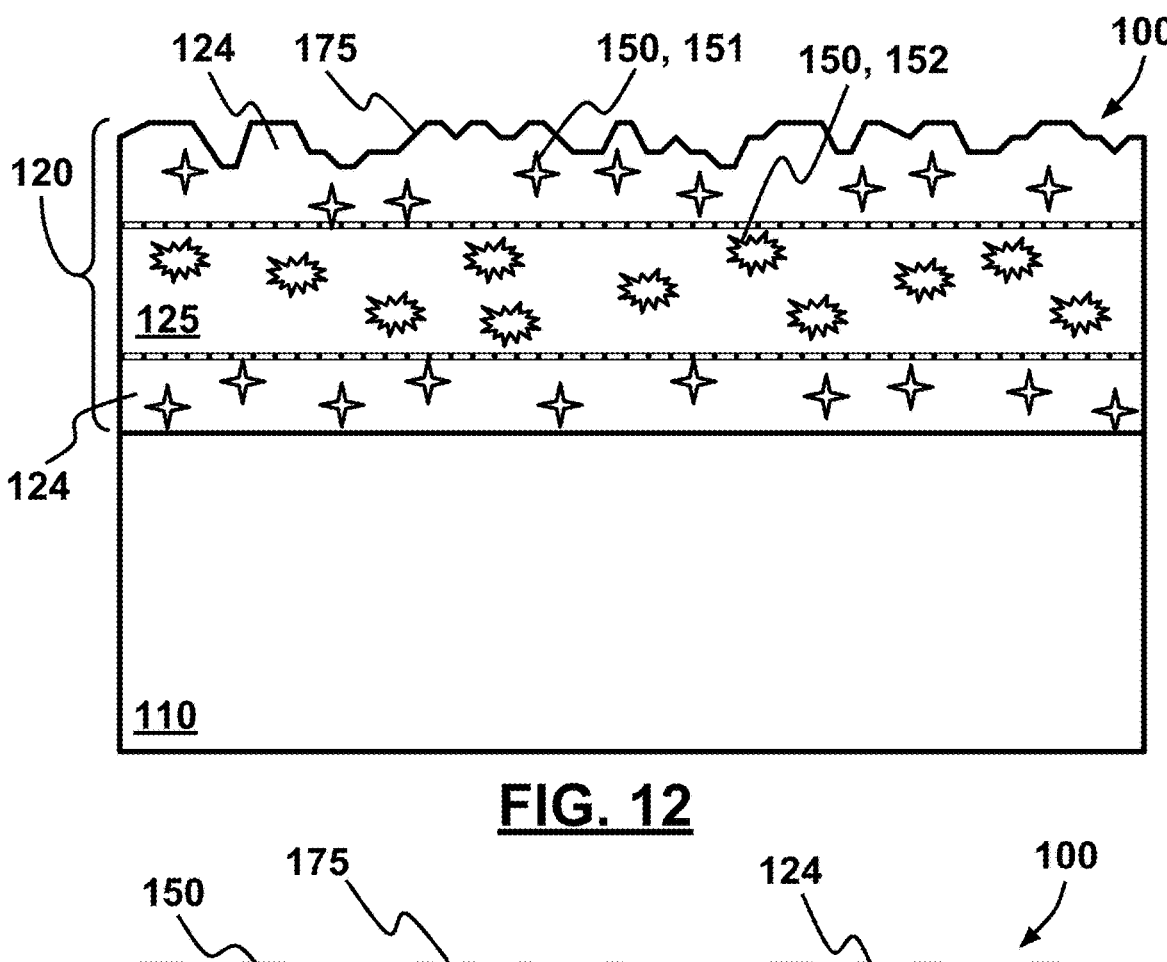

In the non-limiting example of FIG. 8, the material used for the sheet 125 has a sufficiently porous structure that the porosity agent 150 saturate and penetrate into sheet 125. However, in the non-limiting example of FIG. 9, the material used for the sheet 125 is not sufficiently porous to permit the porosity agent types 151 and 152 to saturate and penetrate into sheet 125, thus all of the porosity agents 150 in FIG. 9 are confined to the space above and below the sheet 125. FIG. 12 depicts a non-limiting example of a sheet 125 that has been impregnated with or manufactured to contain one or more porosity agents 150 before being saturated in a resin saturation bath 340. Thus, porosity agent 152 of FIG. 12 is already present in the sheet 125 when the sheet is saturated in the resin saturation bath 340 to add the resin 324 and the porosity agent 151.

In some embodiments, the resin 124 (a thermosetting polymer resin, a thermosetting acrylic resin, or a combination of a thermosetting polymer resin and a thermosetting acrylic resin) is deposited only on the top surface of the sheet 125. Existing manufacturing techniques allow a resin binder layer to be deposited on top of a sheet of paper. FIG. 13 depicts a non-limiting example of where the resin 124 containing porosity agents 150 is deposited only on the top surface of the sheet 125, which results in the porosity agent 150 residing on top of the sheet 125, but not below the sheet 125.

In numerous implementations, a backing layer 111 is applied to the resin binder layer 120. The backing layer 111 may serve one or more of the following purposes: promote adhesion between a porous panel product and the adjacent resin binder layer 120; stiffen the stainable resin binder layer 120; omit one or more steps (e.g., etching or sanding) involved in preparing the porous panel product for adhering to the adjacent resin binder layer 120; show decorative designs and/or colors through non-opaque resin binder layer(s) 120; or provide a smooth surface for laminate melamine adhesion. The backing layer 111 may be a sheet coated or saturated in a phenolic resin, such as a sheet of paper or kraft paper soaked in phenolic resin or phenol formaldehyde resin. Multiple backing layers 111 of the same or different types may be affixed between the substrate 110 (e.g., a porous panel product) and the stainable resin binder layer 120 (e.g., see FIG. 11). A backing layer 111 is not limited to using sheets of paper, and various natural fibers (e.g., wood, pulp, cotton, ground coconut shells, ground corn stocks, etc.) and/or synthetic fibers or sheets (e.g., plastics, nylon, fiberglass reinforced plastic, etc.) may be used as a backing layer 111. Similarly, a backing layer 111 is not limited to using phenolic resins.

In some implementations, decorative designs may be printed, deposited, etched, carved, scored, sanded, stamped, engraved, embossed, burned, fixed, and/or marked on one or more of a decorative paper layer, kraft paper, a backing layer 111, or directly on a substrate 110 or core (e.g., a porous panel product). In some implementations, surface embossing or other variations are introduced with a textured caul plate or an embossed sacrificial layer in a melamine press. FIGS. 2 and 8 depict non-limiting examples of a decorative paper layer 130 (e.g., a design printed as a printed layer 132 on the decorative paper) that may be saturated with melamine, thermosetting acrylic, phenolic, urea formaldehyde, or other laminating resins. FIG. 9 depicts a non-limiting example of a design printed as a printed layer directly on a porous panel product (or another substrate 110 or core) with a backing layer 111 and decorative paper layer 130 omitted. FIG. 10 depicts a non-limiting example of a textured design etched (e.g., sanded, laser-etched, carved, etc.) directly on a substrate 110. The decorative design may include any one or more of various different colors within a color space (including hue, saturation, and lightness). The decorative design may also be as simple as a single color with nothing printed or etched thereon. These decorative designs may mimic natural products (e.g., wood, wood veneers, fibers, plants, etc.), geometric shapes or patterns, artistic designs, or other designs according to consumer taste and demand. If a decorative design is printed, etched, or otherwise used, then the resin binder layer(s) 120 above the decorative design will have at least a degree of transparency (e.g., using translucent overlay paper) so that the decorative design is visible or otherwise changes the appearance of the stainable laminate product 100. In some implementations the decorative design mimics a wood grain. In certain preferred implementations the decorative design mimics a wood grain where the saturation and/or lightness is adjusted so that the colors used produce a wood grain design that allows the wood stain or colorant that is subsequently added to the stainable resin binder layer 120 to adjust the final look of the color. In some implementations, the stainable resin binder layer 120 has a textured surface 175 (e.g., see FIGS. 8, 12, and 13). The textured surface 175 may primarily serve as a decorative element to enhance the look or feel of the stainable laminate product 100. The textured surface 175 allows for deeper penetration of the stain into the recessed portions of the surface, thereby providing additional visual depth to the stained surface. The textured surface 175 may be added using textured pressing plates of a melamine press (e.g., caul plates, embossed sacrificial sheets or foils, or the like), and may be implemented using either high pressure or low pressure melamine press configurations. In some implementations, the textured surface 175 may also be formed after pressing the melamine and etching or otherwise texturing the melamine (and before the thermosetting polymer resin 124 fully cures or hardens). The texture may also be applied through a method of roller application in which the graining pattern is applied through pressure in a continuous embossing process. The textured surface 175 may be used with any combination of: decorative designs (i.e., including colors) on the backing and/or decorative paper; multiple layers of melamine (both stainable resin binder layers 120 and conventional resin binder layers; or multiple layers of backing, substrates, overlay papers, and/or decorative paper. The textured surface 175 may also be used on a stainable resin binder layer 120 above a conventional resin binder layer containing an overlay, decorated or undecorated paper or foil, or other paper.

A stainable laminate product 100 may include a plurality of resin binder layers 120 and/or a plurality of decorative paper layers 130, backing layers 111, cores, or substrates 110. Multiple backing layers 111 or substrates 110 may be used (as mentioned above) and one or more of these backing layers 111 can be or contain a decorative paper layer 130 (e.g., a decorative paper, a textured or embossed paper, a printed backing, and so forth). In some implementations, the stainable laminate product 100 includes two or more layers of resin binder stacked one atop the other. In some implementations at least the top-most layer is a stainable resin binder layer 120 that includes at least one type of porosity agent 150. The stainable laminate product 100 may contain a traditional or standard resin binder layer (e.g., providing strength and/or sealing benefits) positioned below a stainable resin binder layer 120 that includes at least one type of porosity agent 150 enabling a wood stain, colorant, or stain to embed into the second resin binder layer 120. The stainable laminate product 100 may also include different porosity agents 150 depending on the resin binder layer 120, such as a first stainable resin binder layer 120 having only one type of porosity agent 150 while a second stainable resin binder layer 120 has multiple types of porosity agents 150. In some implementations a layer of resin binder includes one or more porosity agents 150 that are embedded or deposited only in an upper portion of the resin binder layer 120 (as shown in FIG. 13).

In certain preferred implementations, the stainable laminate product 100 includes a textured surface 175 formed by a textured pressing plate of a resin binder press on a substrate affixed to a decorative paper and one to three non-opaque resin binder layers 120 containing at least one type of porosity agent 150. In some implementations, the stainable laminate product 100 includes a substrate affixed to a first side of a backing layer 111 having a decorative paper on a second side of the backing layer 111, and at least one non-opaque resin binder layer 120 affixed to the decorative paper, wherein at least the top-most resin binder layer 120 contains at least one type of porosity agent 150 and has a textured surface 175. In certain implementations, the stainable laminate product 100 includes a backing layer 111, where a decorative paper is fixedly sandwiched between the backing layer 111 and one to three non-opaque resin binder layers 120, where the top-most resin binder layer 120 contains at least one type of porosity agent 150 and has a textured surface 175.

The present invention is further illustrated by the Figures and Claims that should not be construed as limiting. The contents of all references, patents, and published patent applications cited throughout this application, as well as the Figures, are incorporated herein by reference in their entirety for all purposes.

What is claimed is:

1. A method of manufacturing a stainable melamine laminate product with a porous surface that enables a stain, pigment, or dye to penetrate and provide a stain effect, the method comprising:

saturating a sheet with a stainable melamine formulation, the stainable melamine formulation comprising at least one porosity agent, wherein the at least one porosity agent creates a porous surface in the melamine formulation to enable a stain, pigment, or dye to penetrate the melamine formulation;

partially curing the saturated sheet, separately from a substrate, with heat to form a partially-cured sheet; and pressing the partially-cured sheet directly or indirectly to the substrate under heat and pressure to form the stainable melamine laminate product, wherein the substrate is a wood or engineered wood product;

wherein the east one porosity agent comprises at least 35% of the weight of the melamine formulation before curing; and wherein the sheet is a decorative paper or fiber sheet.

2. The method of manufacturing the stainable melamine laminate product of claim 1, further comprising:

applying a stain to the stainable melamine laminate product; and applying a finishing coat to the stainable melamine laminate product.

3. The method of claim 1, wherein at least one porosity agent is a mineral ranging in size from 1-75 μm and/or a density from 1.0 to 3.5 g/cm$^3$.

4. The method of claim 1, wherein the stainable melamine layer further comprises at least a second porosity agent selected from the group consisting of: crystalline silica; feldspar; titanium dioxide; untreated silica particles; Nepheline Syenite; silicon dioxide; calcium oxide; iron oxide; and silicate minerals.

5. The method of claim 1, wherein the at least one porosity agent comprises calcium carbonate, or a combination of calcium carbonate and silicon dioxide, and is at least 50% of the weight of the melamine formulation after curing.

6. A method of manufacturing a stainable melamine laminate product with a porous surface that enables a stain, pigment, or dye to penetrate and provide a stain effect, the method comprising:

saturating a sheet with a stainable melamine formulation, the stainable melamine formulation comprising at least one porosity agent, wherein the at least one porosity agent creates porous surface in the melamine formulation to enable a stain, pigment, or dye to penetrate the melamine formulation;

partially curing the saturated sheet, separately from a substrate, with heat to form a partially-cured sheet; and pressing the partially-cured sheet directly or indirectly to the substrate under heat and pressure to form the stainable melamine laminate product;

wherein the substrate is a wood or engineered wood product; and wherein the sheet is a non-opaque paper or fiber sheet affixed to a phenolic backing layer, the phenolic backing layer having a decorative design and a first side and a second side opposite the first side, the first side being affixed to the substrate and the second side being affixed to the sheet.

7. A method of manufacturing a stained melamine laminate product with a porous surface in a melamine formulation that enables a stain, pigment, or dye to penetrate the melamine formulation and provide a stain effect, the method comprising:

(a) saturating a paper or fiber sheet with a stainable melamine formulation, the stainable melamine formulation comprising at least one porosity agent, wherein the at least one porosity agent creates a porous surface in the melamine formulation to enable a stain, pigment, or dye to penetrate the melamine formulation;

(b) partially curing the saturated sheet, separately from a wood or engineered wood substrate, with heat to form a partially-cured sheet;

(c) pressing the partially-cured sheet directly or indirectly to the substrate under heat and pressure to form the stainable melamine laminate product;

(d) applying a stain, pigment, or dye to the stainable melamine laminate product; and (e) applying a finishing coat to the stainable melamine laminate product;

wherein the at least one porosity agent is selected from the group consisting of: talc, calcium carbonate, precipitated calcium carbonate, or a combination thereof.

8. The method of claim 7, wherein the at least one porosity agent further comprises at least one porosity agent selected from the group consisting of: kaolin clay; crystalline silica; corn starch; feldspar; titanium dioxide; mica; untreated silica particles; cellulosic particles; wax particles; Nepheline Syenite; silicon dioxide; sodium oxide; calcium oxide; iron oxide; potassium oxide; wollastonite; silicate minerals; and combinations thereof.

9. The method of claim 7, wherein the at least one porosity agent further comprises crystalline silica.

10. A method of manufacturing a stained melamine laminate product with a porous surface in a melamine formulation that enables a stain, pigment, or dye to penetrate the melamine formulation and provide a stain effect, the method comprising:

(a) saturating a paper or fiber sheet with a stainable melamine formulation, the stainable melamine formulation comprising at least one porosity agent, wherein the at least one porosity agent creates a porous surface in the melamine formulation to enable a stain, pigment, or dye to penetrate the melamine formulation;

(b) partially curing the saturated sheet, separately from a wood or engineered wood substrate, with heat to form a partially-cured sheet;

(c) pressing the partially-cured sheet directly or indirectly to the substrate under heat and pressure to form the stainable melamine laminate product;

(d) applying a stain, pigment, or dye to the stainable melamine laminate product; and (e) applying a finishing coat to the stainable melamine laminate product, wherein the at least one porosity agent is a combination of porosity agents and is at least 40% of the weight of the melamine formulation after curing.

11. The method of claim 10, wherein the combination of porosity agents is at least 50% of the weight of the melamine formulation after curing and comprise calcium carbonate and silicon dioxide.

12. A method of manufacturing a stainable melamine laminate product with a porous surface in a melamine formulation that enables a stain, pigment, or dye to penetrate the melamine formulation and provide a stain effect, the method comprising:

(a) saturating a paper or fiber sheet with a stainable melamine formulation, the stainable melamine formulation comprising at least one porosity agent selected from the group consisting of: talc, calcium carbonate, or a combination thereof, wherein the at least one porosity agent creates a porous surface in the melamine formulation to enable a stain, pigment, or dye to penetrate the melamine formulation;

(b) partially curing the saturated sheet, separately from a wood or engineered wood substrate, with heat to form a partially-cured sheet; and (c) pressing the partially-cured sheet directly or indirectly to the substrate under heat and pressure to form the stainable melamine laminate product.

13. The method of manufacturing the stainable melamine laminate product of claim 12, further comprising:

(d) applying a stain to the stainable melamine laminate product; and (e) applying a finishing coat to the stainable melamine laminate product.

14. The method of claim 12, wherein the porosity agent or the combination of porosity agents comprises at least 35% of the weight of the melamine formulation before curing and the sheet is a decorative paper.

15. The method of claim 12, wherein the sheet is non-opaque and affixed to a phenolic backing layer, the phenolic backing layer having a decorative design and a first side and a second side opposite the first side, the first side being affixed to the substrate and the second side being affixed to the sheet.

16. The method of claim 12, wherein at least one porosity agent is a mineral ranging in size from 1-75 $\mu$m and/or a density from 1.0 to 3.5 g/cm$^3$.

17. The method of claim 12, wherein the stainable melamine layer further comprises at least a second porosity agent selected from the group consisting of: crystalline silica; feldspar; titanium dioxide; untreated silica particles; Nepheline Syenite; silicon dioxide; calcium oxide; iron oxide; and silicate minerals.

18. The method of claim 17, wherein the at least porosity agent comprises calcium carbonate and silicon dioxide and is at least 50% of the weight of the stainable melamine formulation after curing.

*     *     *     *     *